(12) United States Patent
Siepmann et al.

(10) Patent No.: US 9,665,403 B2
(45) Date of Patent: May 30, 2017

(54) EXECUTING ALGORITHMS IN PARALLEL

(71) Applicant: Miosoft Corporation, Madison, WI (US)

(72) Inventors: Ernst M. Siepmann, Pembroke Pines, FL (US); Albert B. Barabas, Fitchburg, WI (US); Mark D. A. van Gulik, Madison, WI (US)

(73) Assignee: Miosoft Corporation, Madison, WI (US)

( * ) Notice: Subject to any disclaimer, the term of this patent is extended or adjusted under 35 U.S.C. 154(b) by 478 days.

(21) Appl. No.: 13/842,253

(22) Filed: Mar. 15, 2013

(65) Prior Publication Data

US 2014/0282600 A1    Sep. 18, 2014

(51) Int. Cl.
*G06F 9/44* (2006.01)
*G06F 9/50* (2006.01)

(52) U.S. Cl.
CPC ............. *G06F 9/5066* (2013.01); *G06F 9/44* (2013.01)

(58) Field of Classification Search
CPC ..... G06F 9/45; G06F 9/52; G06F 9/54; G06F 8/52; G06F 8/443
See application file for complete search history.

(56) References Cited

U.S. PATENT DOCUMENTS

| 5,499,371 A | 3/1996 | Henninger |
| 5,535,389 A | 7/1996 | Elder |
| 5,596,746 A | 1/1997 | Shen et al. |
| 5,627,979 A | 5/1997 | Chang |
| 5,873,093 A | 2/1999 | Williamson et al. |

(Continued)

FOREIGN PATENT DOCUMENTS

| WO | WO 2011/100557 | 8/2011 |
| WO | WO 2012/067890 | 5/2012 |

OTHER PUBLICATIONS

Bakhtouchi et al., "Chapter 11: Mediated Data Integration Systems Using Functional Dependencies Embedded in Ontologies," Recent Trends in Information Reuse and Integration, Springer-Verlag, Wien, Aug. 20, 2011, pp. 227-256.

(Continued)

*Primary Examiner* — Lewis A Bullock, Jr.
*Assistant Examiner* — Tina Huynh
(74) *Attorney, Agent, or Firm* — Fish & Richardson P.C.

(57) ABSTRACT

Among other things, a machine-based method comprises receiving an application specification comprising one or more algorithms. Each algorithm is not necessarily suitable for concurrent execution on multiple nodes in parallel. One or more different object classes are grouped into one or more groups, each being appropriate for executing the one or more algorithms of the application specification. The executing involves data that is available in objects of the object classes. A user is enabled to code an algorithm of the one or more algorithms for one group in a single threaded environment without regard to concurrent execution of the algorithm on multiple nodes in parallel. An copy of the coded algorithm is distributed to each of the multiple nodes, without needing additional coding. The coded algorithm is caused to be executed on each node in association with at least one instance of a group independently of and in parallel to executing the other copies of the coded algorithm on the other nodes.

48 Claims, 15 Drawing Sheets

(56) References Cited

U.S. PATENT DOCUMENTS

| | | | |
|---|---|---|---|
| 5,893,108 | A | 4/1999 | Srinivasan et al. |
| 5,937,409 | A | 8/1999 | Wetherbee |
| 5,987,247 | A | 11/1999 | Lau |
| 6,023,578 | A | 2/2000 | Birsan |
| 6,038,565 | A | 3/2000 | Nock |
| 6,122,641 | A | 9/2000 | Williamson et al. |
| 6,134,559 | A | 10/2000 | Brumme et al. |
| 6,134,706 | A | 10/2000 | Carey |
| 6,154,748 | A | 11/2000 | Gupta et al. |
| 6,175,837 | B1 | 1/2001 | Sharma et al. |
| 6,199,195 | B1 | 3/2001 | Goodwin et al. |
| 6,279,008 | B1 | 8/2001 | Tung Ng et al. |
| 6,301,584 | B1 | 10/2001 | Ranger |
| 6,311,194 | B1 | 10/2001 | Sheth et al. |
| 6,421,821 | B1* | 7/2002 | Lavallee ............. G06F 8/34 717/109 |
| 6,609,133 | B2 | 8/2003 | Ng et al. |
| 6,700,590 | B1 | 3/2004 | DeMesa |
| 6,768,986 | B2 | 7/2004 | Cras et al. |
| 7,072,934 | B2 | 7/2006 | Helgeson |
| 7,103,600 | B2 | 9/2006 | Mullins |
| 7,120,629 | B1 | 10/2006 | Seibel et al. |
| 7,149,730 | B2 | 12/2006 | Mullins et al. |
| 7,152,070 | B1 | 12/2006 | Musick et al. |
| 7,249,048 | B1 | 7/2007 | O'Flaherty |
| 7,328,216 | B2 | 2/2008 | Hofmann et al. |
| 7,681,176 | B2 | 3/2010 | Wills |
| 7,689,560 | B2 | 3/2010 | Barabas et al. |
| 7,953,765 | B2 | 5/2011 | Vaught |
| 8,141,032 | B2 | 3/2012 | Joo |
| 8,868,597 | B2 | 10/2014 | Mohamad Abdul et al. |
| 2002/0156932 | A1* | 10/2002 | Schneiderman ............. 709/317 |
| 2002/0169658 | A1* | 11/2002 | Adler ............. G06Q 10/06 705/7.28 |
| 2002/0174417 | A1 | 11/2002 | Sijacic |
| 2003/0033437 | A1 | 2/2003 | Fischer |
| 2003/0058277 | A1 | 3/2003 | Bowman-Amuah |
| 2003/0172368 | A1 | 9/2003 | Alumbaugh et al. |
| 2003/0233370 | A1 | 12/2003 | Barabas et al. |
| 2004/0267768 | A1 | 12/2004 | Harjanto |
| 2005/0166187 | A1* | 7/2005 | Das ............. G06F 9/546 717/136 |
| 2005/0177827 | A1* | 8/2005 | Fong et al. ............. 717/171 |
| 2005/0257193 | A1 | 11/2005 | Falk et al. |
| 2006/0026599 | A1* | 2/2006 | Herington ............. G06F 9/5083 718/105 |
| 2006/0122990 | A1 | 6/2006 | Smith et al. |
| 2006/0129605 | A1 | 6/2006 | Doshi |
| 2006/0206861 | A1 | 9/2006 | Shenfield et al. |
| 2006/0218123 | A1* | 9/2006 | Chowdhuri et al. ............. 707/2 |
| 2007/0118839 | A1* | 5/2007 | Berstis et al. ............. 718/105 |
| 2007/0157171 | A1* | 7/2007 | Eastham ............. G06F 8/71 717/121 |
| 2008/0022259 | A1* | 1/2008 | MacKlem et al. ............. 717/113 |
| 2009/0063555 | A1 | 3/2009 | Fisher et al. |
| 2009/0150344 | A1* | 6/2009 | Herness ............. G06Q 10/06 |
| 2009/0307655 | A1* | 12/2009 | Pingali et al. ............. 717/106 |
| 2010/0031232 | A1* | 2/2010 | Glazier et al. ............. 717/106 |
| 2010/0082691 | A1* | 4/2010 | Jaster ............. G06F 17/30734 707/792 |
| 2010/0223591 | A1* | 9/2010 | Shi et al. ............. 717/102 |
| 2010/0306733 | A1* | 12/2010 | Bordelon et al. ............. 717/106 |
| 2011/0153505 | A1 | 6/2011 | Brunswig |
| 2012/0137304 | A1 | 5/2012 | Boullery et al. |
| 2012/0144376 | A1* | 6/2012 | Van Eijndhoven et al. .. 717/146 |
| 2012/0166771 | A1* | 6/2012 | Ringseth ............. G06F 8/31 712/220 |
| 2012/0272247 | A1* | 10/2012 | Scott et al. ............. 718/108 |
| 2012/0278353 | A1 | 11/2012 | Carrato et al. |
| 2012/0317543 | A1 | 12/2012 | Baudel |
| 2013/0166598 | A1 | 6/2013 | Vaitheeswaran |
| 2013/0275951 | A1* | 10/2013 | Dolby ............. G06F 11/366 717/126 |
| 2014/0053148 | A1* | 2/2014 | Chan et al. ............. 717/174 |
| 2014/0279942 | A1 | 9/2014 | Siepmann et al. |

OTHER PUBLICATIONS

Bernstein et al., "Applying Model Management to Classical Meta Data Problems," CIDR, Jan. 2003, vol. 2003, pp. 209-220.

Di Lorenzo et al., "Data Integration in Mashups," SIGMOD Record, vol. 38, No. 1, Mar. 2009, pp. 59-66.

Gartner et al., "Object-oriented modeling of data sources as a tool for the integration of heterogeneous geoscientific information," Computers & Geosciences, vol. 27, Issue 8, Oct. 2001, pp. 975-985.

Glissman et al., "Systematic Web Data Mining with Business Architecture to Enhance Business Assessment Services," SRII 2011, San Jose, CA, Mar. 29-Apr. 2, 2011, pp. 472-483.

Lu et al., "A Data Model for Data Integration," Electronic Notes in Theoretical Computer Science, vol. 150, Issue 2, Mar. 23, 2006, pp. 3-19.

Rahi et al., "Business Intelligence: A Rapidly Growing Option through Web Mining," IOSR Journal of Computer Engineering, vol. 6, Issue 1, Sep.-Oct. 2012, pp. 22-29.

Roy et al., "Facilitating Enterprise Service Discovery for Non-technical Business Users," ICSOC 2010 Workshops, LNCS 6568, Springer-Verlag, Berlin, Germany, © 2011, pp. 100-110.

Sahoo et al., "A Survey of Current Approaches for Mapping of Relational Databases to RDF," W3C RDB2RDF, Incubator Group Survey Report, Jan. 8, 2009, 15 pages.

Staniszkis et al., "Integration of Pre-existing Heterogeneous Information Sources in a Knowledge Management System," Electronic Government, Lecture Notes in Computer Science, Springer-Verlag, Berlin, Germany, 2004, vol. 3183, pp. 507-514.

Sugumaran et al., "The Role of Domain Ontologies in Database Design: An Ontology Management and Conceptual Modeling Environment," ACM Transactions on Database Systems, vol. 31, No. 3, Sep. 2006, pp. 1064-1094.

U.S. Appl. No. 13/841,730, filed Mar. 15, 2013.

Bernstein et al., "A Vision for Management of Complex Models," SIGMOD Record, vol. 29, No. 4, Dec. 2000, pp. 55-63.

Bhattacharya et al., "Towards Formal Analysis of Artifact-Centric Business Process Models," BPM 2007, LNCS 4714, pp. 288-304, 2007. © Springer-Verlag Berlin Heidelberg 2007.

Cohn et al., "Business Artifacts: A Data-centric Approach to Modeling Business Operations and Processes," Bulletin of the IEEE Computer Society Technical Committee on Data Engineering, vol. 32, No. 3, Sep. 2009, pp. 1-7.

Czarnecki et al., "Mapping Features to Models: A Template Approach Based on Superimposed Variants," GPCE 2005, LNCS 3676, pp. 422-437, 2005. © Springer-Verlag Berlin Heidelberg 2005.

Grigori et al., "Business Process Intelligence," *Computers in Industry*, 53(3):321-343 (2004).

IEEE 1000: The Authoritative Dictionary of IEEE Standards Terms, 7th Edition, IEEE Press, New York, NY, © 2000, pp. 3-4, 172, 701 and 752.

Jennings, "Autonomous Agents for Business Process Management," *Applied Artificial Intelligence*, 14:145-189, 2000 (Copyright © 2000 Taylor & Francis).

Khoshafian et al., Object Orientation, 2nd Edition, John Wiley & Sons, Inc., New York, NY © 1995, pp. 33-57.

Recker et al., "Business Process Modeling—A Comparative Analysis," *Journal of the Association for Information Systems*, vol. 10, Issue 4, pp. 333-363, Apr. 2009.

Russell et al., "On the Suitability of UML 2.0 Activity Diagrams for Business Process Modelling," APCCM '06, vol. 53, Australian Computer Society, © 2006, pp. 95-104.

Beginnersbook.com, "Multithreading in java with examples" (2013), [online], [retrieved on Jun. 2, 2015]. Retrieved from the Internet: http://beginnersbook.com/2013/03/multithreading-in-java/.

(56) References Cited

OTHER PUBLICATIONS

Blogspot.com, "Part 12—Table splitting in entity framework" (2014), [online], [retrieved on Jun. 2, 2015]. Retrieved from the Internet: http://csharp-video-tutorials.blogspot.com/2014/05/part-12-table-splitting-in-entity.html.

Yang, Xiaochun, et al., "Modeling Enterprise Objects in a Virtual Enterprise Integrating System: ViaScope", ICSC '99, LNCS 1749, Springer-Verlag, Berlin, Germany, 1999, pp. 166-176.

Rahm, Erhard, et al. "A survey of approaches to automatic schema matching", The VLDB Journal, vol. 10, Issue 4, Dec. 2001, pp. 334-350.

Pending claims for U.S. Appl. No. 13/841,730, filed Mar. 15, 2013.

\* cited by examiner

Visualization of a context and it's fragmented composition

| Data Flow | Expected charge | Actual charge | Discrepancy |
|---|---|---|---|
| 1 — 900 | $19.79 | $12.99 | -$6.80 |
| 2 — 902 | $27.30 | $15.80 | -$11.50 |
| 3 — 904 | $4.67 | $4.67 | $0.00 |
| unexpected | $0.00 | $15.50 | $15.50 |

EXECUTING ALGORITHMS IN PARALLEL

TECHNICAL FIELD

This disclosure relates to executing algorithms in parallel.

BACKGROUND

As the amount and complexity of data becomes more prevalent for businesses, it becomes desirable to store the data in a structured way, e.g., for using the data in computations and analyses. Also, business success needs high-quality data. Even relatively straightforward business processes, such as a customer ordering a widget, can have complex implications for data analysis. The business process itself has many steps: the widget must be manufactured, packaged, and warehoused; the order must be produced and processed; the widget must be retrieved from inventory, packed, shipped, and delivered; a bill must be issued to the customer; and after payment is received, the open transaction must be closed. The real-world implementation of business processes like this often leads to a varied data flow, with multiple databases and scattered data.

Sometimes many tables with relationships of various cardinalities among them are used to represent the richness and interconnection of data elements in the business processes. Large-scale analysis of such tables or data for the business processes can be difficult and expensive.

SUMMARY

In one aspect, the disclosure features a machine-based method comprising receiving an application specification comprising one or more algorithms. Each algorithm is not necessarily suitable for concurrent execution on multiple nodes in parallel. The method also comprises grouping one or more different object classes into one or more groups. Each group is appropriate for executing the one or more algorithms of the application specification. The executing involves data that is available in objects of the object classes. A user is enabled to code an algorithm of the one or more algorithms for one group in a single threaded environment without regard to concurrent execution of the algorithm on multiple nodes in parallel. An copy of the coded algorithm is distributed to each of the multiple nodes, without needing additional coding. The coded algorithm is caused to be executed on each node in association with at least one instance of a group independently of and in parallel to executing the other copies of the coded algorithm on the other nodes. The instance contains objects of the object classes grouped in the group.

In another aspect, the disclosure features a computer program product residing on a computer readable medium. The computer program product comprises instructions for causing a processor to receive an application specification that comprises one or more algorithms. Each algorithm is not necessarily suitable for concurrent execution on multiple nodes in parallel. One or more different object classes are grouped into one or more groups. Each group is appropriate for executing the one or more algorithms of the application specification. The executing involves data that is available in objects of the object classes. A user is enabled to code an algorithm of the one or more algorithms for one group in a single threaded environment without regard to concurrent execution of the algorithm on multiple nodes in parallel. An copy of the coded algorithm is distributed to each of the multiple nodes, without needing additional coding. The coded algorithm is caused to be executed on each node in association with at least one instance of a group independently of and in parallel to executing the other copies of the coded algorithm on the other nodes. The instance contains objects of the object classes grouped in the group.

In another aspect, the disclosure features a computer system comprising a processor, a memory, and a storage device that stores a program for execution by the processor using the memory. The program comprises instructions configured to cause the processor to receive an application specification. The application specification comprises one or more algorithms, each of which is not necessarily suitable for concurrent execution on multiple nodes in parallel. The instructions are also configured to cause the processor to group one or more different object classes into one or more groups. Each group is appropriate for executing the one or more algorithms of the application specification. The executing involving data that is available in objects of the object classes. A user is enabled to code an algorithm of the one or more algorithms for one group in a single threaded environment without regard to concurrent execution of the algorithm on multiple nodes in parallel. An copy of the coded algorithm is distributed to each of the multiple nodes, without needing additional coding. The coded algorithm is caused to be executed on each node in association with at least one instance of a group independently of and in parallel to executing the other copies of the coded algorithm on the other nodes. The instance contains objects of the object classes grouped in the group.

Embodiments of the disclosure, including the machine-based methods, the computer program products, and/or the systems may also include one or more of the following features.

Each of the multiple nodes is a physical node. Each node constitutes a single thread or a single process for executing the coded algorithm. The one or more algorithms comprises a business function. The coded algorithm is caused to be executed on each node on a single instance of a group using a single process, and different processes are independent of each other. A weight is assigned to each node and the weight is proportional to a number of instances associated with the node. The weight is the same for all nodes to which copies of the coded algorithm are distributed. The distribution of copies of the coded algorithm is expanded to additional nodes and the coded algorithm is caused to be executed on each of those additional nodes without affecting the existing distribution of the coded algorithm and the existing execution of the coded algorithm. Each node is associated with a single instance. Each node is assigned with a unique identifier that identifies the corresponding single instance. Each instance is associated with a single copy of the coded algorithm and a single node. A root object class is identified within each group and an entire instance of a group can be retrieved based on an object of the root object class contained in the instance. A user is enabled to save meta data of the grouping into a single file. The coded algorithm is executed on a node using one process to access an object contained in an instance without contention from other processes used for concurrently executing the coded algorithm on other instances.

Other features, objects, and advantages will be apparent from the description and drawings, and from the claims.

DETAILED DESCRIPTION

Figure 1A:
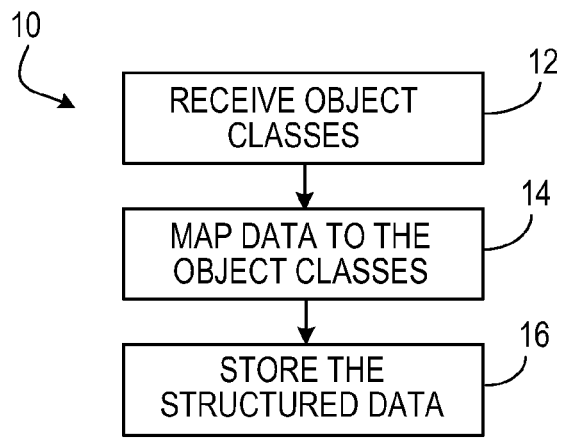
FIG. 1A is a flow diagram showing an example of a process for structuring data.

Data in any entity, such as a business, a department of a business, etc., can be stored in a structured manner based on object-oriented models (for simplicity, we call these "object models"). The structured data can be processed, e.g., computed, analyzed, supported, or cleansed, and can maintain its high quality for use in business processes at a relatively low cost. Data quality issues can be readily detected under the data structure, and root causes of the data quality issues can be examined. Resolving the quality issues through their root can prevent similar issues from occurring in the future and reduce the cost of supporting and updating the data. Furthermore, the structured data can provide good scalability, performance, and cost properties to machines, such as computer systems, that implement the storage and use of the data. The data and processes using the data can be distributed among many machines, e.g., a cluster of computing devices or nodes, and multiple processes can be performed concurrently to provide high efficiency.

Generally, the data of a business can come from various business processes (e.g., orders, billing, shipping, marketing, etc.) and from various business systems (e.g., the order department, the billing department, the shipping department, the marketing department, etc.). The data may have been stored (recorded or documented) at different locations, e.g., on paper or in one or more databases of one or more storage devices. In some situations, undocumented workarounds are used in carrying out certain business processes. The workarounds can affect what the business processes produce and can cause values of the actual data in the business systems to be different from what are expected or required. In some implementations, the expected data values are known to a business or can be determined based on analyses of the implemented business processes, which may reveal the use of the data and its expected values. The discrepancies between the actual data and the expected data may be identified as data quality issues.

The data of a process or in a business can include many types. For example, in addition to being numerical, the data can also be categorical or other types. As an example, the data can record whether or not a source business system in the business has sent an expected message to a destination business system, whether the message has reached its destination, and/or how the destination system has used the message to update its data. When the data is recorded without being missing or containing incorrect portions, the quality of the data is deemed to be high. Low quality data can adversely affect the performance of the business processes.

Generally, businesses analyze their data to produce results that are meaningful under a business context. For example, a business may want to know the sources of its revenue, the percentage of revenue from retail sales and the percentage from whole sales, customer behaviors (returning to the business or not, purchasing in store or online), etc. The data needed for the analyses to produce such meaningful results may be located in different databases and different business systems. Gathering all data in a business by simply physically putting all the data in the same location, e.g., in the same table or storage device, can create a massive database with a flat data structure. Analyzing, maintaining, and updating such a massive database can be time consuming, technically difficult, and costly.

Sometimes the data that provides a reader or an analyst with comprehensive understanding of a business context or a parameter within the business context (such as customer information) are scattered across different business systems. Gathering this data together based on a flat data structure can further complicate the data processing.

The data in a business that is useful for analyses (sometimes all data) can be structured based on object models. Software applications can be stored on and executed by one or more computers to structure the data. For example, the one or more computers can be at the user's end. The applications can provide a user (e.g., an analyst of the business) with interface, e.g., a graphical user interface, to interact with the applications. As an example, a process 10 for structuring the data of a business is shown in FIG. 1A. The one or more computers can receive (12) object classes defined by a user for an object model and map (14) the data of the business, e.g., unstructured data or structured data, to the object classes to form object instances in the object classes. Sometimes the software applications implemented by the one or more computers can provide class options (or recommendations) for the user to define object classes or can automatically define the object classes based on the user's business or interest.

The object classes can be defined based on the analytics to be performed. Examples of object classes for customer billing can include a customer class, an order class, a billing class, and others. For example, objects in the customer class can include customer name object, customer gender object, customer address object, etc. Each object has one or more attributes (e.g., the name, the gender, the address(es)) that have data values mapped from the data of the business. Different databases storing the data can be accessed and data can be retrieved to be mapped to the attributes of the objects to form object instances. The mapped data is then stored (16) at the one or more computers or at a different device or location. The stored data has an object-oriented data structure. The data in such a structure can be retrieved quickly and help an analyst to understand the data under the business contexts without complicated data gathering. In some implementations, instead of or in addition to the data, the mapping scheme is also stored.

A user (e.g., a developer) of the object model for the data structure can interact directly with the objects of the defined classes (which is also called instances). Data behavior of the instances can be analyzed (e.g., computations) at each object. For example, to calculate the total for each customer bill, a bill class can define a code snippet for calculating the bill total. When a user wants to calculate the total for all bills of all customers, a message can be passed to each object to request the calculation, and each object will return a calculated result. The object models can readily allow job distribution and job parallelism: two different objects can be put in two different logical and/or physical locations. An additional system can be used to track the location of all existing objects. In some implementations, an object model may not provide sufficient information to determine how to distribute the objects, and a user determines the distribution, e.g., by defining ranges of the hash of an object identifier integer to control which objects go to which node. Objects can be programmably grouped based on their classes. However, computations over all object instantiations of the same class may not be easily scalable. In some implementations, a user may need to place interconnected objects to be physical near each other, so that the related objects from the same class or from different classes can be retrieved readily.

In some implementations, different object classes and objects of the same class or of different classes can have relationships under business contexts. For example, when considering the billing of customers, object classes: customer class and billing class are relevant and related to each other under the billing business context. When considering billing for a particular customer, the customer object of the customer class and the bill object of the billing class are relevant and are related to each other for this particular business perspective. Depending on the business contexts in which data is to be analyzed, the relationships between different object classes and between different objects can have different strengths. In the previous example, the customer class and the billing class, and the customer object and the bill object have a strong relationship for processing and investigating customers' and a particular customer's billing. However, other object classes may not be closely related to the customer class; or the customer object may also relate to other objects in other object classes of the object model. Those relationships may be weak under the customer billing context (although in a different business perspective, they may be strong), e.g., those other objects do not contribute significantly to the processing and investigation of the customer's billing.

We call a group of object classes grouped for a particular business context of interest a context type. The objects (and the data in the objects) of the same class and of different classes can be grouped into groups based on the context type and the business interest. We call the groups of the objects "contexts." One object class can be part of multiple context types. For example, an address object class can be in both a "person" context type and a "business" context type. However, each object belongs to no more than one context. In the example above, one address object of the object address class can only be in a single context, either of the person context type or the business context type. Each context type can correspond to multiple contexts.

The object classes and objects can be grouped in different manners to form different sets of context types and contexts when the business contexts for the data processing and analysis change. Each context type is independent of the other context types within the business perspective of interest, and there can be multiple context types for a business.

Context boundaries are used to define the different contexts types, and accordingly, the contexts. The context boundaries determine what related object classes are to be included in a context type. For example, when the business context of interest is billing for different customers and a customer context type needs to be formed, a context boundary is defined to include only the customer class and the billing class. Other classes are not grouped in this context type. Based on the context type, a context can be formed for each customer independent of other customers.

The context boundaries are defined based on the business context of interest and is related to the strength of the relationship between object classes in different context types. The software applications can determine the boundaries or a user can input the boundaries by directly grouping the object classes or by defining a threshold strength for the relationships such that all object classes having relationships with a strength lower than the threshold are placed into different context types. All object types having relationships with a strength higher than the threshold belong to the same context type. The relationships among object classes in the same context and in different contexts are maintained by the applications.

The context boundaries can represent a natural way for users to describe contextual similarity and difference (e.g., within a business) among object classes or objects in the same class or in different classes. For example, an order may have a relationship with a product catalog class, which may or may not be grouped in the same context type with the customer class. The context type captures desired relationships among objects classes defined by, e.g., a developer or software applications.

In some implementations, the context boundary is to define a context type and create a single context for each customer. A customer may have many things known about him or her in disparate systems, such as addresses, bills, payments, inquiries, and orders. Each category of information can form a class under an object model. In other words, different objects related to the same customer (or context) can belong to different classes. However, all objects for the customer can be located in the same context with referential relationships among them. Another example of a context defined for the interest of a business can include a purchase context that includes data related to product information, customer information, and payment information.

As an example, the context boundaries can be determined using the following example of processes/rules. Objects of classes without relationships defined have implicit context boundaries between them. Objects of classes with relationships between them are logically grouped without context boundaries. Accordingly, objects instantiated from those classes with relationships may be connected directly with reference relationships, and can be implicitly stored together. However, a user can also be enabled to choose to separate objects of classes with relationships into different contexts type by declaring the relationship a context boundary. Such classes have a so-called context snipped relationship. In the example of customer context discussed above, the product catalog may be placed in a different context that has a context snipped relationship with the customer context. Using context snipped relationships, the user can also define summary data (which is a subset of the data available in the context) about objects in a context to be shared with objects in another context.

One or more contexts can be formed for each context type when the data of the business is consolidated by the context type. For example, a customer context can be formed for each customer for the customer context type. A context is formed from a consolidation (match then merge) of context fragments. A context fragment type is a structure that corresponds to the structure of a context type. A context fragment contains object instances of the object classes that are defined in the context fragment type and that contain data from a single data source of the business. Data from one or more sources that have the same or different formats can be mapped to context fragments based on descriptions of all necessary parsing and transformation of data from the data sources. Context fragments are formed by forming context fragments instances from data in a data source. The contexts can collect data or information from the process or parts of the process that have already been performed, regardless of how many business systems the process involves, into a comprehensive graph of related objects. Each context treats individual piece of data or information as an attribute of a fragment of the context, regardless of the source of the data or information.

A context can include objects instantiated while merging fragments matched in the manner discussed below to provide a comprehensive set of values for the context. In an example, when a customer class, a payment class, and a bill class are defined, associative relationships between the different classes can include: a customer can have many bills, and a customer can have many payments. There are no context boundaries between these classes because of the associations. A customer object for John Smith, customer payment objects for John Smith, and customer bill objects for John Smith are all physically grouped into a context with referential object relationships between them.

In addition to intra-context relationships among the objects in the same context, different contexts can maintain an inter-context relationship that connects object instances from two or more context instances. The inter-context relationship can be between two contexts of the same context type or even different context types. For example, when the data of one context is updated, data of all other contexts that have inter-context relationships with this context can be updated accordingly.

For the purpose of the discussion, a context model is understood to include an object model and uses context boundaries to identify contexts. The object classes of an object model and the context types of the context model can be in the form of meta data stored by one or more computers. The models can be applied to the data of the business to enable actions, e.g., algorithms, computations, analysis, etc. to be taken on the data. Similar to object being instances of object classes, contexts can be understood as instances of context types.

Figure 10:
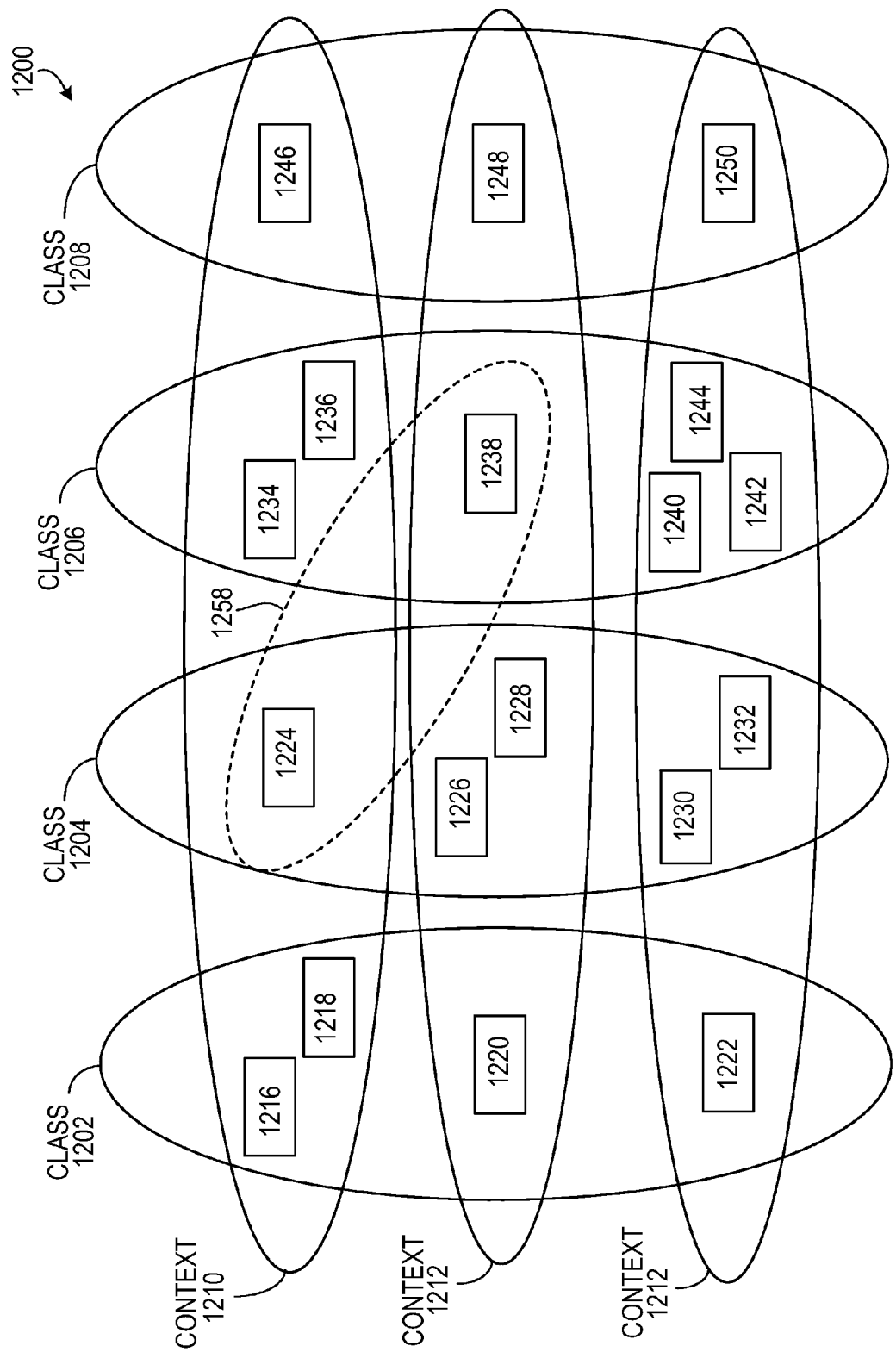
FIG. 10 is a block diagram showing an example of a context model.

As an example, a context model 1200 in FIG. 10 includes an object model that contains classes 1202, 1204, 1206, 1208. Objects 1216-1250 are distributed among the classes. As shown in the figure, objects 1216-1222 are in the class 1202, objects 1224-1232 are in the class 1204, objects 1234-1244 belong to the class 1206, and objects 1246-1250 belong to the class 1208. The classes can be, e.g., a bill class. In addition, the objects classes 1202, 1204, 1206, 1208 are conceptually (e.g., under a particular business context) associated, e.g., for customers, purchases, etc., and a context boundary to include all four classes is defined to group these four classes into one context type. Within this context type, multiple contexts can be formed 1210, 1212, 1214 can be formed (e.g., by consolidating data based on the context type). Alternatively, a context type can be formed by grouping the object class 1204 and the object class 1206 under a different business context of interest. A context 1258 can be formed based on this context type.

To form a context model, a computer system can allow a user to specify an object model, including classes, class attributes, and relationships (e.g., for the context model). In addition, implicit and explicit context boundaries that determine what objects (and data) are stored in the same context are also determined, e.g., by the user or automatically by the software applications. Through the context model, a user also identifies an object class as a context root class for each context type. The object class to which a context root belongs is known as being context root capable. In an interconnected object graph of an object model, each object can be viewed as a node in the graph, and a context root is an instance of the context root class and is the root node to be connected by relationships (direct or indirect) to all other objects within a single context. A context root is defined and exists in every context. A context root has a direct or indirect relationship to all other object instances in its context, even if some of the relationships may be unidirectional. In addition, some objects can be referenced globally and are said to have identity. Generally, objects do not have to be context roots to be referenced globally from any object of any context.

The data from different sources of the business can be integrated and be grouped into the contexts using a variety of techniques, such as joins, transformations, standardization, and fuzzy matching through interfaces, such as built-in interfaces of various types like XML, CSV, ODBC, IBM WebSphere MQ and web services. Even IMS Data such as exported by IBM's FABHURG1 unload utility can be supported for these implementations. In a real-world entity of interest, information or data related to one business process often exists in disparate systems. For example, a corporation name and contract number in one system (e.g., computer or database), contract number and details of the contract in a different system, and a corporation name and contact information in another different system.

A user or a computer system matches context fragments and then merges the matched fragments to produce a context. The context can provide a user with good understanding of an object under the business context. The context can be retrieved together for data processing and provide efficiency. The data from different sources of the business can be uploaded into the context model and be stored, along with all meta data of the context model at the same location or at different locations.

A user can select or define rules for the context fragment matching. In some implementations, the system implementing the methods can store rules for the user to choose or modify, e.g., through a user interface. The user can also add new rules that are not related to those stored rules. The new rules defined by the user can be stored for the user to use in the future, or for other users to use. Some examples of the rules are as follows:

Key connection (equal): Two context fragments have the same value for a key attribute.

Transitive matching: Two otherwise non-matching context fragments are placed in the same context because of their mutual match to another context fragment: if A matches B and B matches C, then A, B, and C are matched and grouped in the same context, even if A and C do not necessarily match.

Fuzzy matching: Two context fragments are matched using one of several mathematical algorithms that perform a more tolerant comparison than byte-by-byte exact matching, such as Q-Gram, phonetic, or typo allowance matching.

Any number of match rules can be selected or defined. For a group of context fragments, fragment matching is performed on each fragment with all other fragments in the group. In some implementations, during fragment matching, an entire set of selected or defined rules is applied to all pairs of fragments using a Boolean OR approach. In other words, two fragments that match under any of the rules are deemed to match. Within each rule, the terms of the rule are applied using a Boolean AND approach. In other words, all terms within a single rule must be satisfied to produce a match under this rule. Different sets of match rules can be selected or defined for different processes/businesses.

Figure 2:
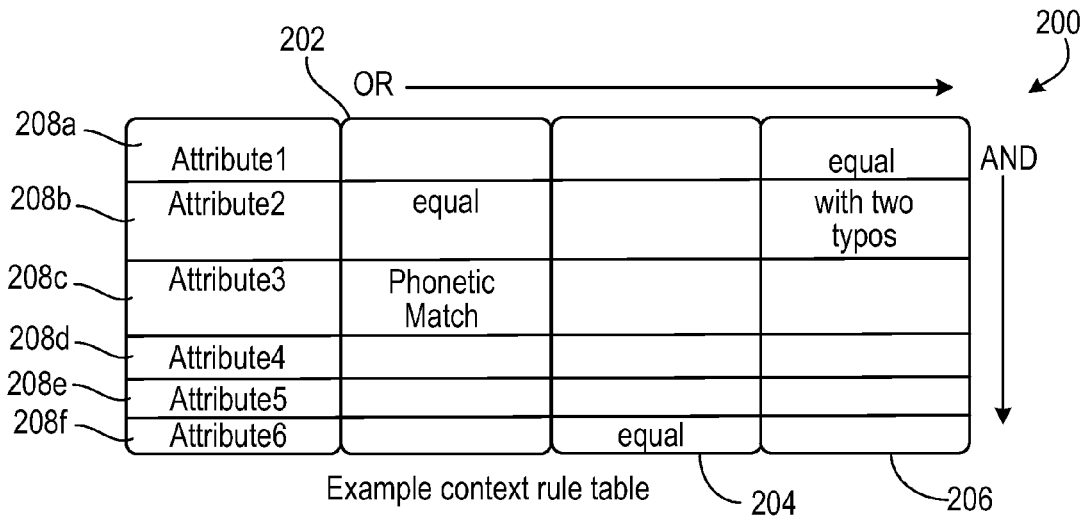
FIG. 2 is an example of a rule table.

The match rules for a process can be represented or stored in a context rule table. In the example table 200 shown in FIG. 2, three rules 202, 204, 206 (in columns) are defined to determine whether or not two context fragments match. Each rule 202, 204, 206 has one or more terms applicable to the different attributes 208a-208f (in rows). As explained previously, within a single rule, the two context fragments match only when all terms of the rule are satisfied. For example, under the rule 202, only when the attributes 2 of both context fragments are equal and the attributes 3 of both context fragments match based on the Q-Gram algorithm, are the two context fragments deemed to match. Under the rule 204, only when the attributes 6 of both context fragments are equal, are the two context fragments deemed to match. Under the rule 206, only when the attributes 1 are equal and the attributes 2 match under a two-typo-allowance algorithm, are the two context fragments deemed to match. However, the context fragments do not have to match under all three rules 202, 204, 206. Instead, as long as the fragments match under at least one of the rules in the rule table 200, the fragments are treated as matching.

Figure 3:
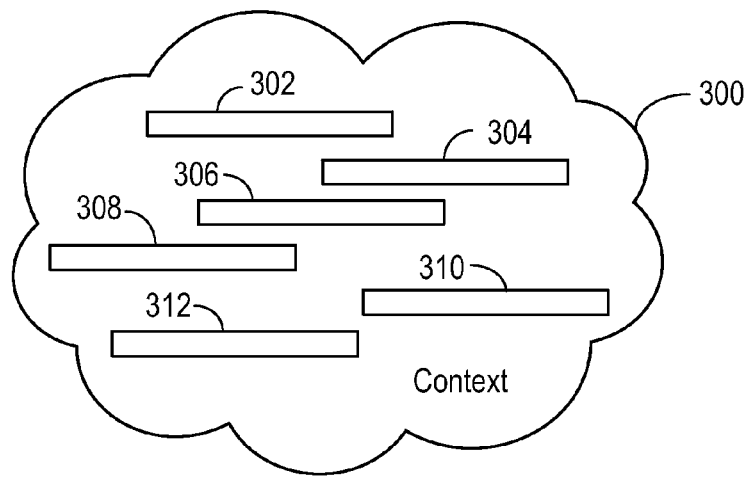
FIG. 3 is a block diagram showing an example of a context containing grouped context fragments.

Contexts are formed based on object relationships and the data corresponding to the objects of each context contains integrated data from context fragments that match based on the match rules, e.g., those stored in a context rule table. As an example, a context 300 of FIG. 3 contains context fragments 302, 204, 306, 308, 310, 312 that match under a set of match rules selected by a user or a system (e.g., the rules in the table 200 of FIG. 2). The contexts can be generated efficiently, e.g., quickly and without a high level of complexity, and flexibly by retaining all data for a process of interest inside the contexts.

In some implementations, one or more sub-contexts are formed within a context. A sub-context can be formed when fewer than all objects of a context are needed for investigating particular business objectives under the business context of interest based on which the context is formed. Certain business contexts of interest or business objectives, e.g., data quality analysis, follow specific patterns that include identification and counting of multiple objects in a context. However, there may be more data in a context than is needed for the analysis. In some situations, the unnecessary data can be wrongly placed in the context due to data quality issues within a business. In such situations, instead of the entire context, the analysis can be performed on a sub-context to produce the desired results.

For example, when a data analysis for a business using the object model and/or the context model identifies how many instances of a specific object class (e.g., customers, contracts, orders, bills, etc.), a certain property in relation to all instances of this object class can be revealed. As an example, in studying a business trend or business pattern, the question "How many percent of customers are under-billed?" is asked to identify the number of customers who are under-billed and weight the number against the total number of customers. One aspect of such data analyses is to identify a unique set of objects, such as the exact number of customers in the business. Sometimes an object can be identified by an identifier, e.g., a customer identification. The number of distinct identifiers is equal to the number of customers in the business.

In some situations, when the data of the business is grouped into customer contexts, a context may include data for more than one customer. Such situations may occur for multiple reasons. For example, the source of the data in the business may not be error free. The different business systems from which the data is collected or retrieved may be connected by keys that are inconsistent (key connections are also discussed further below). Multiple customers may wrongly reference the same object(s) over a strong relationship from a customer context perspective. When all customers sharing the same object(s) are grouped into one customer context, the customer context may contain multiple customers. Another example of the reasons is data in motion. For example, a customer moving from one location to another may reference objects that are still in use by other customers.

When a context contains multiple instances of an object class (i.e., multiple objects of an object class) that is subject to analysis, counting the number of objects may not be reduced to counting the number of their corresponding contexts. Also, analyzing the data of one object is not always the same as analyzing its context, because there may be more than just the data belonging to this particular object instance in the context.

A context is divided into sub-contexts, each sub-context representing one single object instance and all its related data. Two sub-contexts can partially overlap when they share references to a common object. A sub-context can be formed by starting at the object to be analyzed and traversing predefined paths across relationships defined, for example by foreign key connections. Data processing, analysis, computation, etc, is executed on those objects which define the sub-contexts by using only data inside the sub-context.

Figure 11:
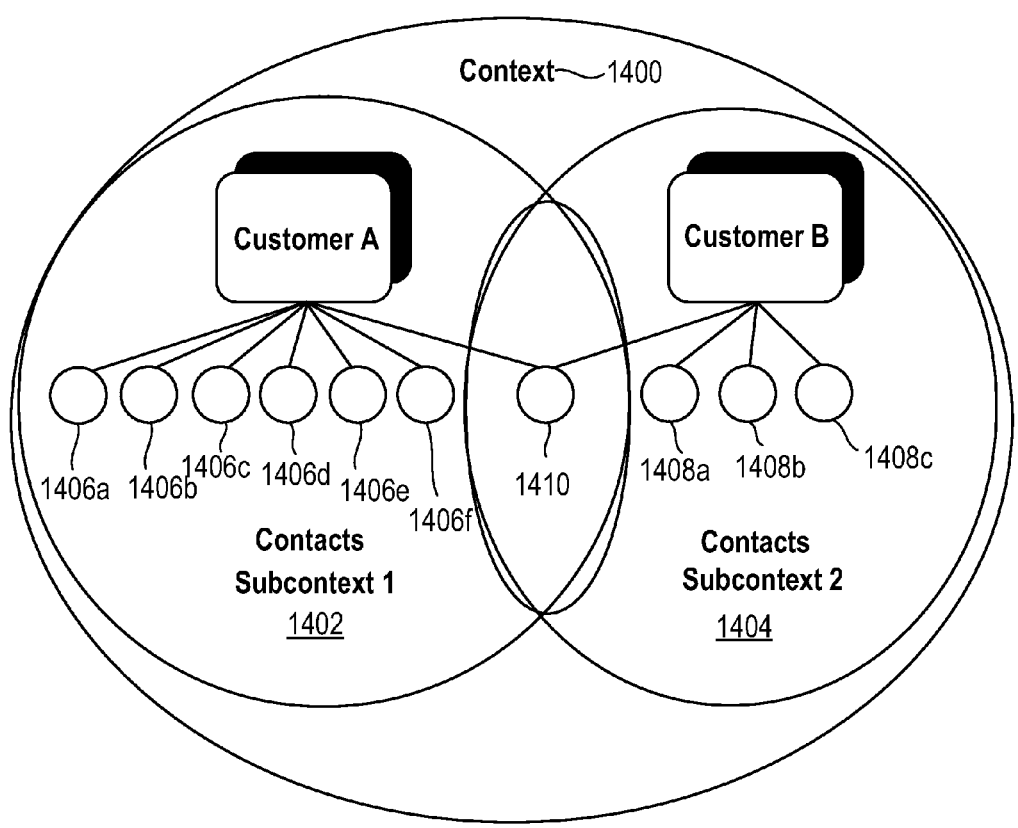
FIG. 11 is a block diagram showing an example of a context containing sub-contexts.

FIG. 11 shows an example of a context 1400 containing two sub-contexts 1402, 1404 formed for two customers A and B. Customer A has 6 regular contracts 1406a-1406f, and Customer B has 3 regular contracts 1408a-1408c. Due to an error in the business, there is another contract 1410 that wrongfully identifies both customers A and B as its owner. The connection through the contract 1410 groups customer A and customer B into the same context 1400. Within the context 1400, to count the number of contracts for each customer A and B, asking the simple question of "how many contracts are in this context?" would not produce the correct answer.

Sub-contexts 1402, 1404 by starting at each contract object that is to be analyzed. The relationship between the contract objects and the customers are used to group the contract objects into different sub-contexts. In this example, contracts that are related to the customer A is grouped into one sub-context 1402 and contracts that are related to the customer B is grouped into another sub-context 1404. In each sub-context 1402, 1404, the question "how many contracts are in this context?" would produce the answer that the customer A has 7 contracts and the customer B has 4 contracts. In total, there are 11 contracts under such counting.

In some implementations, whether or not one contract is referencing two (or more) different customers can be determined, e.g., by asking each customer: "Is there a contract to which I reference also references to another customer?" Alternatively, instead of forming customer contexts, contract contexts can be used.

The context model of this disclosure can be used to provide object representations of data from one or more data sources of a business, and to provide a paradigm for modeling business structure, relationships, and business behavior. In the context model, in addition to classes, contexts contain objects (and data) of different classes having an associative relationship. Context boundaries are formed to denote logical groupings of related classes and objects of different classes, and to allow for physical groupings of object instances of those classes.

Figure 1B:
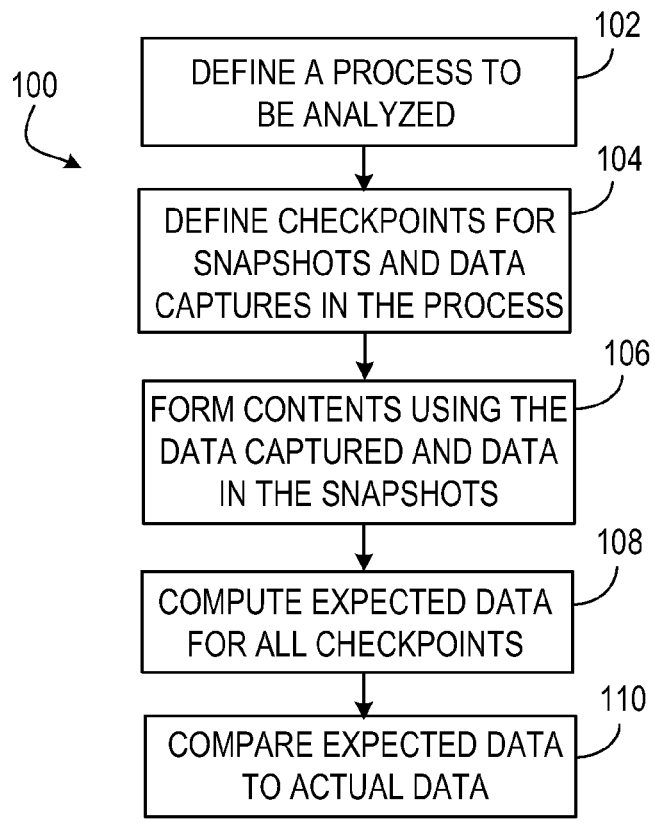
FIG. 1B is a flow diagram showing an example of a process for evaluating data quality and identifying data quality issues.

The object model and the context model for structuring data and maintaining data relationships can be implemented in evaluating data quality in a real-world entity (such as a business). In some implementations, issues with the actual data in a business are identified when differences between expected values and the actual values of the data occur. The differences can be identified and analyzed using a process 100 shown in FIG. 1B. After defining (102) a business process to be analyzed in a business, checkpoints for snapshots and data captures in the process are defined (104). Contexts are formed (106) (e.g., for each data flow in the business process) using the data captured and the data in the snapshots. For example, an object-oriented structure is formed based on the process 10 of FIG. 1A, and context boundaries are defined to form the contexts based on the business interest to be investigated. The expected data for all checkpoints are computed (108), and the actual data captured at the checkpoints in the snapshots are compared (110) with the computed expected data at the respective checkpoints.

The use of the contexts in analyzing data quality can allow all related data for the analysis to be retrieved quickly at a low cost. The scattered data and information that was merged into contexts allows a reviewer of the data or information to understand the data or information readily. The data or data quality can be communicated to the audience, e.g., stakeholders of the business, in a manner that can be easily understood, e.g., in association with the process or contexts. The contexts can be displayed to a user, e.g., during the formation or after the contexts are formed, so that the user can view data quality problems, if there is any. Each context collects (or integrates), e.g., automatically by scanning or accessing different databases, data without the influence from a user's expectation on what data should be collected. Accordingly, data of the processes can be produced objectively and sometimes, unexpected data elements may be collected. All data related to a process for analysis is consolidated and comparing the expected and actual data is simplified. In some implementations, a graphical user interface (GUI) displays to a user data to integrate into the contexts and the object model to allow the user to complete the integration using a few simple mouse clicks.

As discussed for the process 100, the data mapped onto an object model and grouped into contexts can include snapshots of data at rest, a capture of data for a predetermined amount of time as the data is transmitted, or both, to allow for a comprehensive view of data across systems and over time. Checkpoints are defined to mark those points in a business process from which data is gathered (by taking snapshots or capturing) for analysis.

Generally, at least two checkpoints are defined for comparing the actual data and the expected data. For example, two checkpoints can be placed at or near the beginning and the end of a process. Additional checkpoints can be placed between the beginning and the end of the process, e.g., in relatively complex business processes. Sometimes, at least one checkpoint is placed in each system that is critical in the process. In some implementations, a checkpoint created at the start of a data flow of a process is called the master checkpoint for assessing the initial values of the systems. All other checkpoints are called data checkpoints.

Additionally, postulated chronological offset can be defined between different checkpoints, depending on the flow of the data. For instance, a data record has to be present in the billing system three days after the record is created in the order system.

Figure 4:
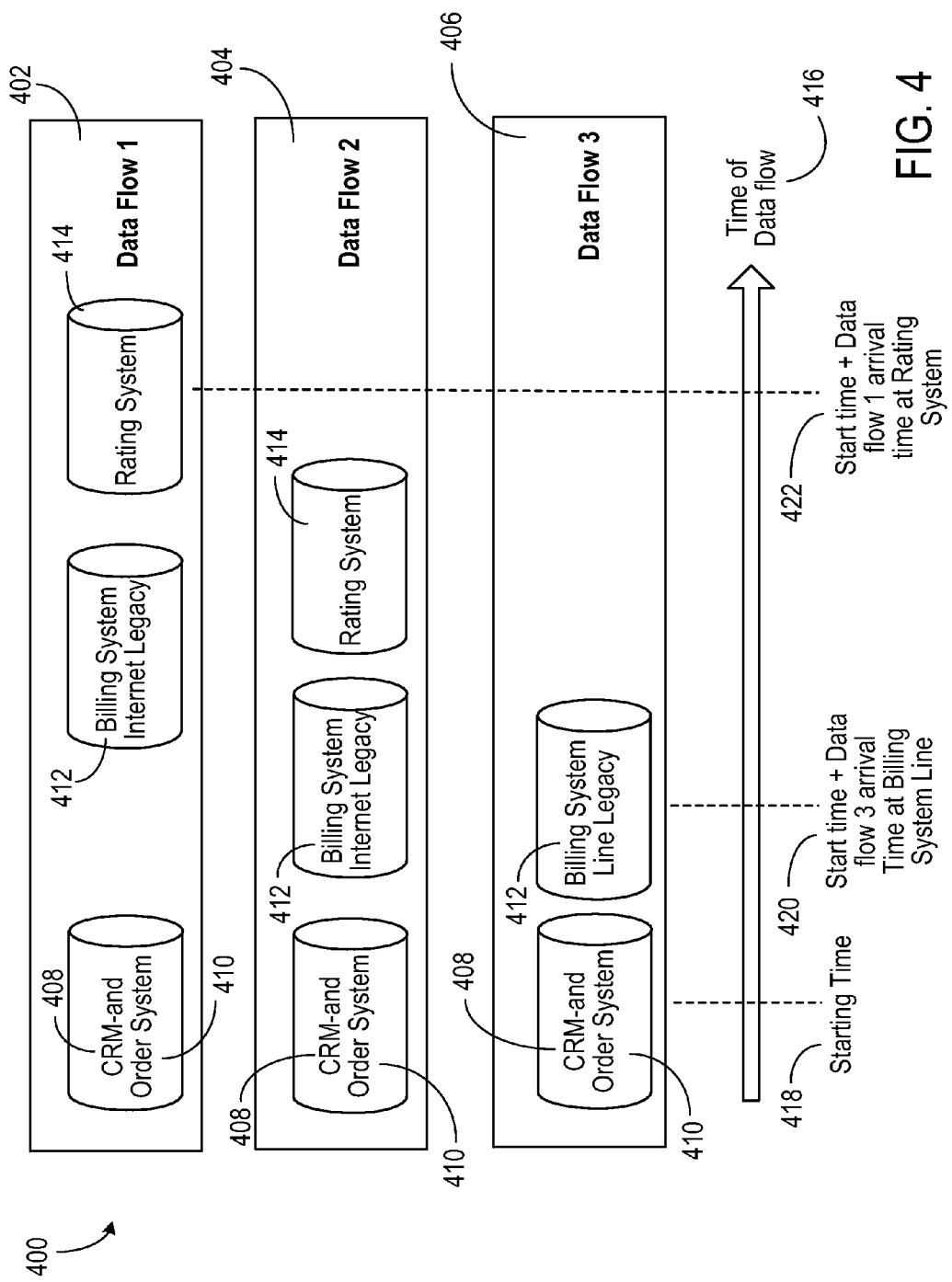
FIG. 4 is a block diagram showing an example of three checkpoints placed in data flows of a process.

An example of defining checkpoints along three data flows 402, 404, 406 of a process 400 is shown in FIG. 4. The process 400 involves data flowing among a CRM (Customer Relationship Management) system 408, an order system 410, a billing system 412, and a rating system 414 in a business. Along the time axis 416 of the data flows, all three data flows 402, 404, 406 simultaneously originate from the CRM system 408 and the order system 410, and travel asynchronously through the billing system 412 and the rating system 414 (with the exception of the data flow 406, which does not reach or pass the rating system 414). To obtain data and analyze the data quality in the process 400, a first check point is placed at the beginning of all three data flows as a master checkpoint. In addition, a second checkpoint 420 (data checkpoint) is placed at the time when the data flow 406 arrives at the billing system 412. A third checkpoint 422 (data checkpoint) is placed at the time when the data flow 402 arrives at the rating system. The data flows 402, 406 each includes two checkpoints at which respective data flows pass two involved systems. In addition, the data flows 402, 404 each have one checkpoint placed on the pathway between the CRM system 408 and the billing system 412.

In this example, the billing system Internet legacy, the billing system line legacy, and the billing system line are three co-existing billing systems in the business's IT architecture. In particular, the billing system internet legacy is from a merger with a company offering internet services. In other words, this formerly independent system was added to the existing billing system during a merger and is never replaced or retired. It only bills "Internet service" products. The billing system line legacy only bills "line" products and is the main billing system. The billing system line only bills "line" products and may replace the legacy system line and maybe also the legacy system for internet.

At the defined checkpoints, snapshots of the actual data in the system and/or data captures of the transmitted actual data are gathered for comparison with the expected data to determine the quality of the actual data.

A snapshot represents a view on the data of a system at a specific point in time (a checkpoint). The snapshot can contain data dumped from the system at the checkpoint. A user, such as a business expert, or a computer system can define the content of the snapshot, e.g., entities and data elements to be dumped and included in a snapshot. The snapshots can be in almost any format. Accordingly, the systems can dump their data in a format that requires the least resources. Each snapshot records the exact timestamp of its creation so that the data collected in the snapshot is associated with a recorded time and can be compared with other data collected or calculated for the same time. The data flow of a process does not propagate itself instantaneously through multiple systems, and one or more snapshots are taken at a certain time of the data flow.

The actual data of a snapshot is compared with the expected data, which is calculated from business processes. The comparison allows a user or a computer system to evaluate the data quality as the data is at rest in the systems of the business. A checkpoint can be defined for any system of a business, and accordingly, data quality can be evaluated at every system through which the data flows.

A capture of data or data capture represents a recording of all transmitted messages between two or more systems over a period of time and can be useful for finding the root cause of a problem. The recording can be a single time-stamped file which includes messages transmitted over a bus or over a queue over a predetermined period of time, which can be days or months, e.g., six months. In some implementations, the capture is produced non-intrusively, e.g., by silently listening on an interface between different systems and retrieving all messages passing the interface without removing or altering the messages.

To determine whether the data in a system is correct (e.g., step 108 of FIG. 1 or steps 404, 412, 408), the expected data values for comparison are calculated. In some implementations, the expected data values are derived based on the actual data from the master snapshot, using business rules, e.g., that are provided by user, such as a business process expert, or that are stored on a computer system. The business rules can be applied to transform each value in the master snapshot into an expected data value for all the snapshots and all the captures defined throughout a data flow.

Figure 5:
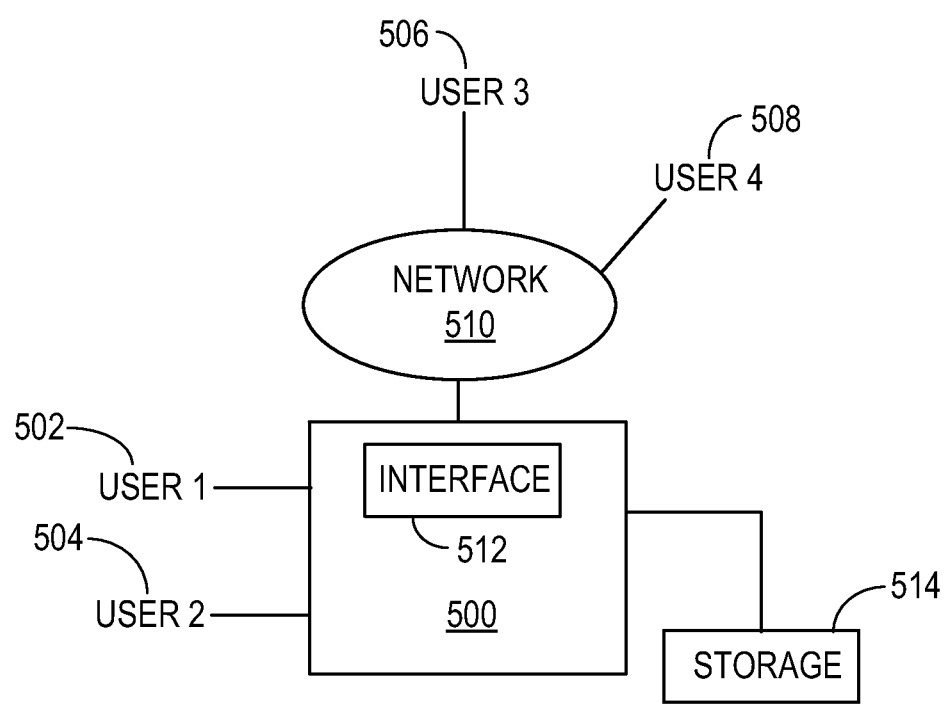
FIG. 5 is a block diagram showing an example of a computer system implementing the methods of the disclosure.

Referring to FIG. 5, the business rules can be gathered from users 502, 504, 506, 508 and be verified through a platform 500. The users can be business process experts or other personnel and can access the platform through machines or computers local to the users and connected to the platform. Some users, such as the users 502, 504 can directly access the platform 500 without an intermediary network, and other users, such as the users 506, 508 can access the platform 500 through one or more networks 510, e.g., the Internet. In the example shown in the figure, the platform 500 provides an interface 512 displayed to the users (at the platform 500 or at the users' machines or computers) to allow the user to input information related to the business rules into the platform 500. The platform 500 can test the received business rules and provide the users with feedback. In some implementations, some users can comment or verify input business rules provided by the other users. The business rules can be updated or modified based on the tests and comments by the platform 500 and/or the users. The finalized business rules can be stored in a storage device 514 (which is part of the platform 500 or connected to the platform 500) for use in generating expected data values described above.

One or more business rules, e.g., a set, can be generated, finalized, and used for one type of business process, or one data flow of a business process. The stored business rules can further be updated based on the feedback of the use. Examples of business rules can include: if an order is in status provisioned, then there must be a record of credit-validity; there must not be two customers with the same customer number; or the number of contracts in the order system must be the same as the number of contracts in the billing system (per customer).

The underlying object model (and/or context model) for the data structure integrates the business rules seamlessly with the data delivered by the various business systems. The master is the basis of the expected capture file values. As with snapshots, business rules are used to transform the capture and produce the expected values for comparison. For example, the business rules are functions (e.g., mathematical functions) that use data from the snapshots and captures as parameters to produce expected values. For example, a snapshot of the order system contains the data "provisioned" as the status of the order. A capture of message from the order system to provisioning has the content: "Build line." The business rule can be:

If
Order status="provisioned" and
capture content: "Build line" and
capture is older than 3 days
then
expected value in Provisioning system="Line Built"

The implementation of the process 100 can reveal the differences between expected values and the actual values of data in the process over a period of time, which can be used in analyzing the root cause of possible issues with the data quality of the process. In particular, the actual data and the calculated expected data are compared for analyzing the data quality of a business process. The process for comparing two objects (or the data associated with the objects) can be built-in the object model or context model through an object-oriented approach. Discrepancies between actual and expected data are often the trigger for a root cause analysis, such as an analysis 600 of FIG. 6 (discussed below), that locates the source of the data problem. Comparing actual and expected data can also reveal expected data that has no actual counterpart from the actual data and/or actual data that has no expected counterpart from the expected data. In addition, the comparison of the actual data and the expected data can be updated by including additional data attributes from the contexts.

In some situations, both data captures and snapshots are used for a root cause analysis, by a user or by a computer system automatically. In the example analysis 600 of FIG. 6, the analysis begins at a system in which a data problem is identified. Processes involving the system are investigated. The captures of incoming messages into the system are used (602) to determine (604, 412) whether the data problem is introduced by the data in the incoming messages or whether the data problem exists in the system itself. If the problem is introduced by the data of the incoming messages, snapshots of the originating system from which the messages originate are examined (606) to determine (608) whether the problem existed in that originating system. The steps are repeated until the source of the identified problem in the data is found (610).

Once identified, the root cause of the data quality problem is traced and analyzed. The system in which the data has quality problem is identified. Sometimes, multiple systems in a process may have the data quality problem. All systems involved in a process that has the data quality problem are identified through the contexts. For each system in which there is a data quality problem, an analysis can be done to find the source of the problem.

In some implementations, to conduct the root cause analyses of a data problem identified in a process or a system, such as the analysis 600, the captures are selected such that the predetermined time period for a data capture (or each data capture) starts and ends at time points at which snapshots are taken. In other words, the starting point and the ending point of a capture of a system synchronize with taking of snapshots of the system or other related systems for analyzing the data problem. Accordingly, changes to the systems are fully recorded through the captures that have starting and ending points recorded by snapshots.

In some implementations, the actual and expected values are categorized after the comparison and root cause analyses are complete. The results of the comparison are analyzed, e.g., by comparing the results with previous results. In some situations, the results are examined by business users using a dashboard or developers and testers by using comprehensive reporting and analysis screens. The results can also be examined by one or more machines automatically. Based on the examination of the results, the data of the business can be unloaded from the contexts, and be manually or automatically cleansed in the systems in which data quality issues have been identified. The cleansed data can be used to transmit corrected messages over existing interfaces of business systems. In some implementations, only keys that point to erroneous data are unloaded from the contexts and the systems in which the erroneous data originates are instructed to resend messages for these data. In some situations, keys together with corrected attributes can be unloaded from the contexts and be transformed into SQL statements that update certain parts in the originating business systems.

Sometimes the degree of an identified data quality problem is determined when assessing data quality, e.g., by the amount of discrepancies between the actual values and the calculated expected values or by how many systems are involved in the root cause. The contexts can be categorized based on the degrees of the data quality problems in the contexts. The categorized contexts can help identifying a relationship between a discovered data pattern and a business problem, understanding how critical the discovered problem is, recognizing patterns in the business problem, tracking trends of increasing/decreasing problems, identifying relationships between clusters if object classes that have identified issues for correlation analyses.

Below, as an example, data quality of a process for a revenue assurance program for determining whether customers are billed correctly is evaluated using the methods described above. The details of the example can be applied to other processes and can be implemented with the features of the methods described above, with or without modifications.

Figure 7A:
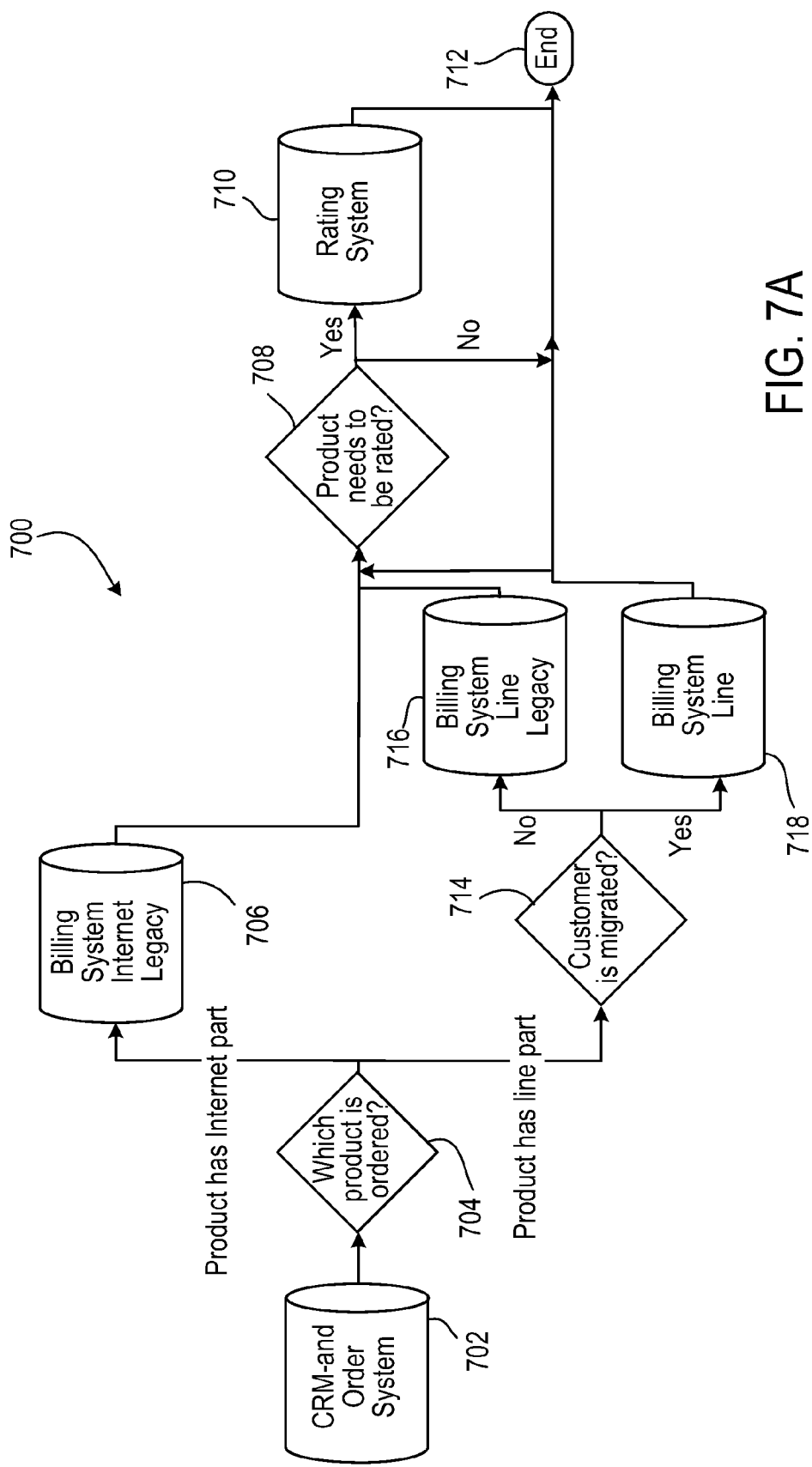
FIG. 7A is a block diagram showing an example of a business process.

Referring to FIG. 7A, a process 700 for revenue assurance is used to process customer bills and determine for a business whether its customers are being billed correctly. The billing knowledge is important for maintaining business processes, and the determination can be complex. The process 700 (or the data flow(s) of the process) starts from the CRM and the order system 702 of the business and determines (704) which product is ordered by the customers. The product may include parts that need to be billed through the billing system Internet legacy (the Internet part), parts that need to be billed through the billing system line legacy (the line part), or both. If the product includes an Internet part, the process is directed to the billing system Internet legacy 706 and determines (708) whether the product needs to be rated. If yes, the process is advanced to the rating system 710 to rate the product before the process ends (712). If no, the process ends (712). If the product includes a line part, the process determines (714) whether the customer is migrated. If not, the process reaches the billing system line legacy 716. If yes, the process is directed to billing system line 718. Again, whether or not the product needs to be rated is determined (708) before the process ends (712). The process 700 involves multiple systems (see, FIG. 7B), and to complete the process 700, data from these systems needs to be collected, integrated, and matched, and analyzed, and issues with data quality need to be identified and resolved.

Figure 7B:
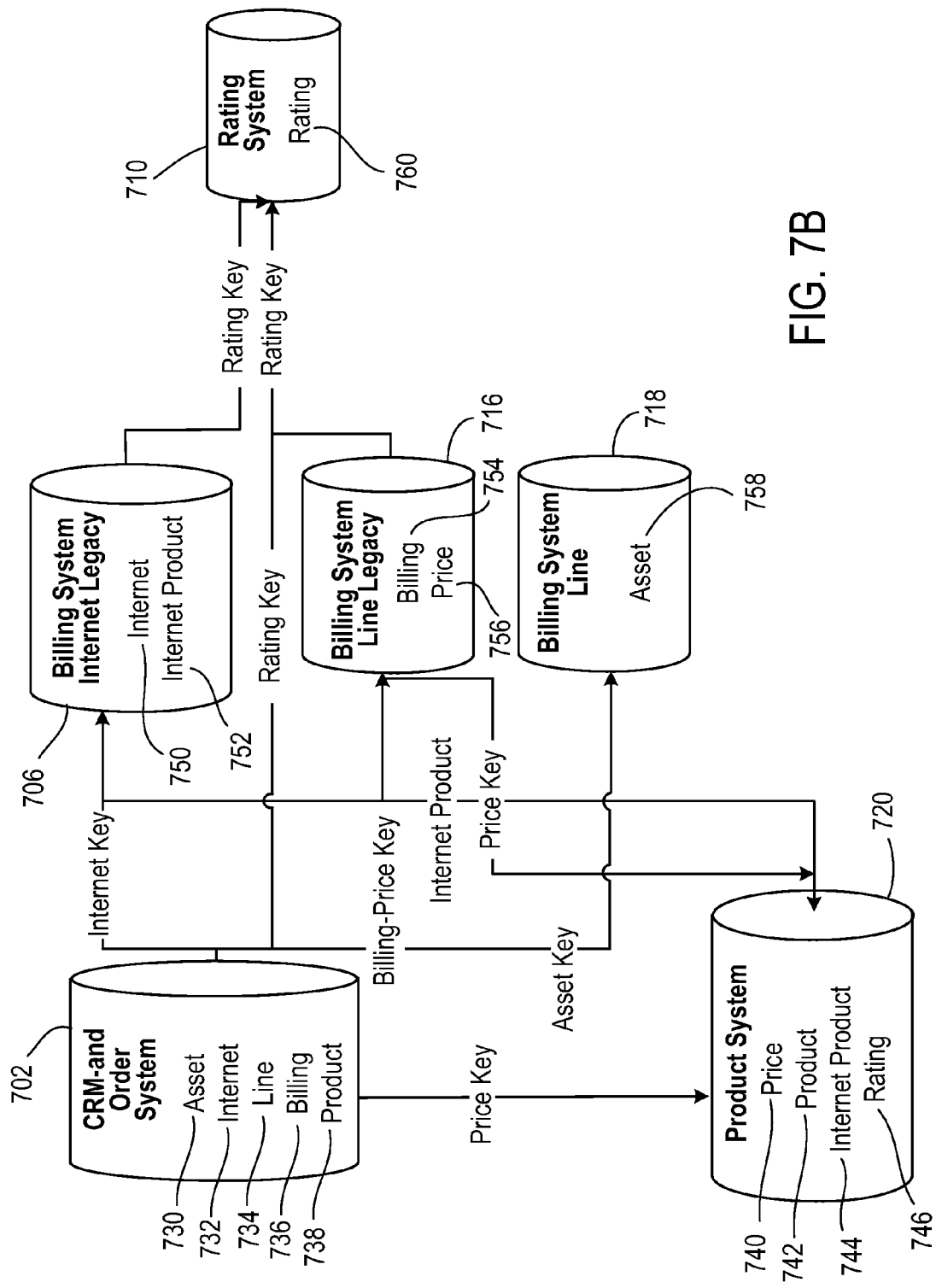
FIG. 7B is a block diagram showing examples of business systems involved in the business process of FIG. 7A.

Referring to FIG. 7B, the systems involved in the model process 700 of FIG. 7A are connected through a complex series of key connections. Data in different systems or from different data sources is associated with one or more keys, and the data having the same key can be joined. For example, an order number can be the key in an order system and a billing system, such that the order lines can be connected to an order through the key. In the example shown in the figure, the data in the CRM and order system 702 may have keys asset 730, Internet 732, line 734, billing 736, product 738; the data in the product system may have keys price 740, product 742, Internet product 744, rating 746; the data in the billing system Internet legacy 706 may have keys Internet 750, Internet product 752; the data in the billing system line legacy may have keys billing 754, price 756; the data in the billing system line 718 may have a key, asset 758; and the data in the rating system 710 may have a key, rating 710. In this example, a product system 720 transforms the keys of the CRM system to match the rating keys, allowing data comparison using the keys. The keys in different systems may have different format, e.g., 10-digit keys with a leading "0" in one system and 9-digit keys without the leading "0" in another system. To compare the keys in the two different systems, the 10-digit keys can be converted to the 9-digit keys by deleting the leading "0," or the 9-digit keys can be converted to the 10-digit keys by adding a leading "0" to all keys. In some implementations, the key transformations are defined and performed when data from the different systems are mapped to the context model, at which time all data is transformed into a standard form. In some implementations, the keys are referenced in the match rules (e.g., the rules of FIG. 2) and usually only equality comparison is applied (i.e., there is no fuzzy matching).

An object class can be defined for each system of FIG. 7B for structuring data in the systems. Furthermore, a context can be defined for each customer. Alternatively, a context can be defined for each product.

Figure 7C:
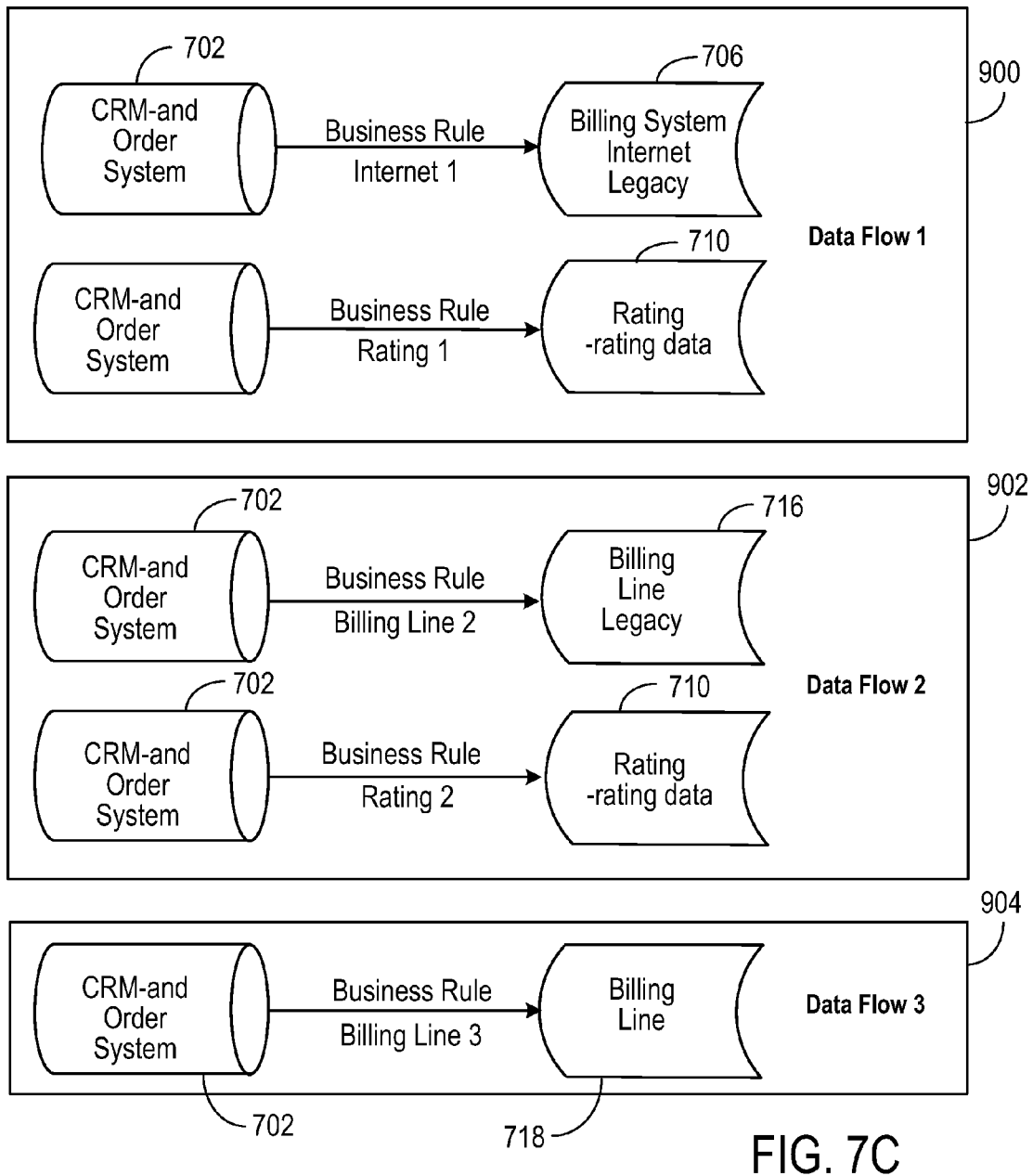
FIG. 7C is a block diagram showing examples of data flows involved in the business process of FIG. 7A.

Referring to FIG. 7C, there are three data flows 900, 902, 904 involved in the model process 700 of FIG. 7A. In the data flow 900, the data flows from the CRM and order system 702 to the billing system Internet legacy 706 and to the rating system 710. In the data flow 902, the data flows from the CRM and order system 702 to the billing system line legacy 706 and to the rating system 710. In the data flow 904, the data flows from the CRM and order system 702 to the billing system line 706. Checkpoints are placed along the data flows, and snapshots and captures are taken similarly to those discussed in connection with FIG. 4.

Figure 7D:
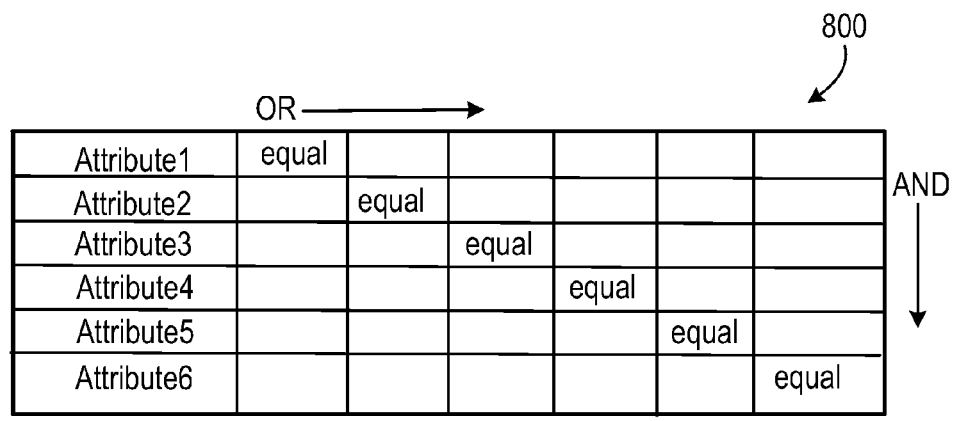
FIG. 7D is an example of a rule table containing rules for integrating context fragments of the business process of FIG. 7A.

The data from the systems of FIG. 7B, collected using checkpoints, snapshots, and captures, are integrated and grouped into contexts based on rules shown in a rule table 800 of FIG. 7D. According to the rule table 800, all attributes 1-6 of two context fragments have to be equal to produce a match of the fragments. The matched fragments are grouped into the same context.

Figure 7E:
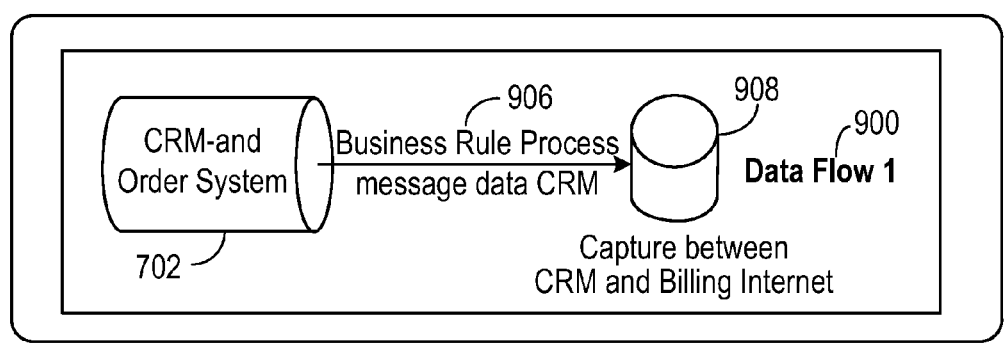
FIG. 7E is a block diagram showing an example of computing expected data for a data flow of the business process of FIG. 7A.

Furthermore, referring again to FIG. 7C, using business rules, expected data values are calculated for comparing with the actual data values. For the data flows 900, 902, 904, five computations are performed. The details of an example computation in the data flow 900 is shown in FIG. 7E. Business rules are applied (906) to message data from the CRM and order system 702. The data transmitted from the CRM and the order system 702 to the billing system Internet legacy 706 is collected in a capture 908. Based on the rules in 906 and the data in the CRM and the order system 702, the expected data to be transmitted between the systems 702, 706 is computed. If an expected message is not in the capture 908, then the root cause of the failure can be the system 702 from which the message is expected originate. If the message is in the capture 908 but the billing system Internet legacy 706 does not have the effects of the update based on the message, then the root cause of the failure is in the system 706.

Figure 7F:
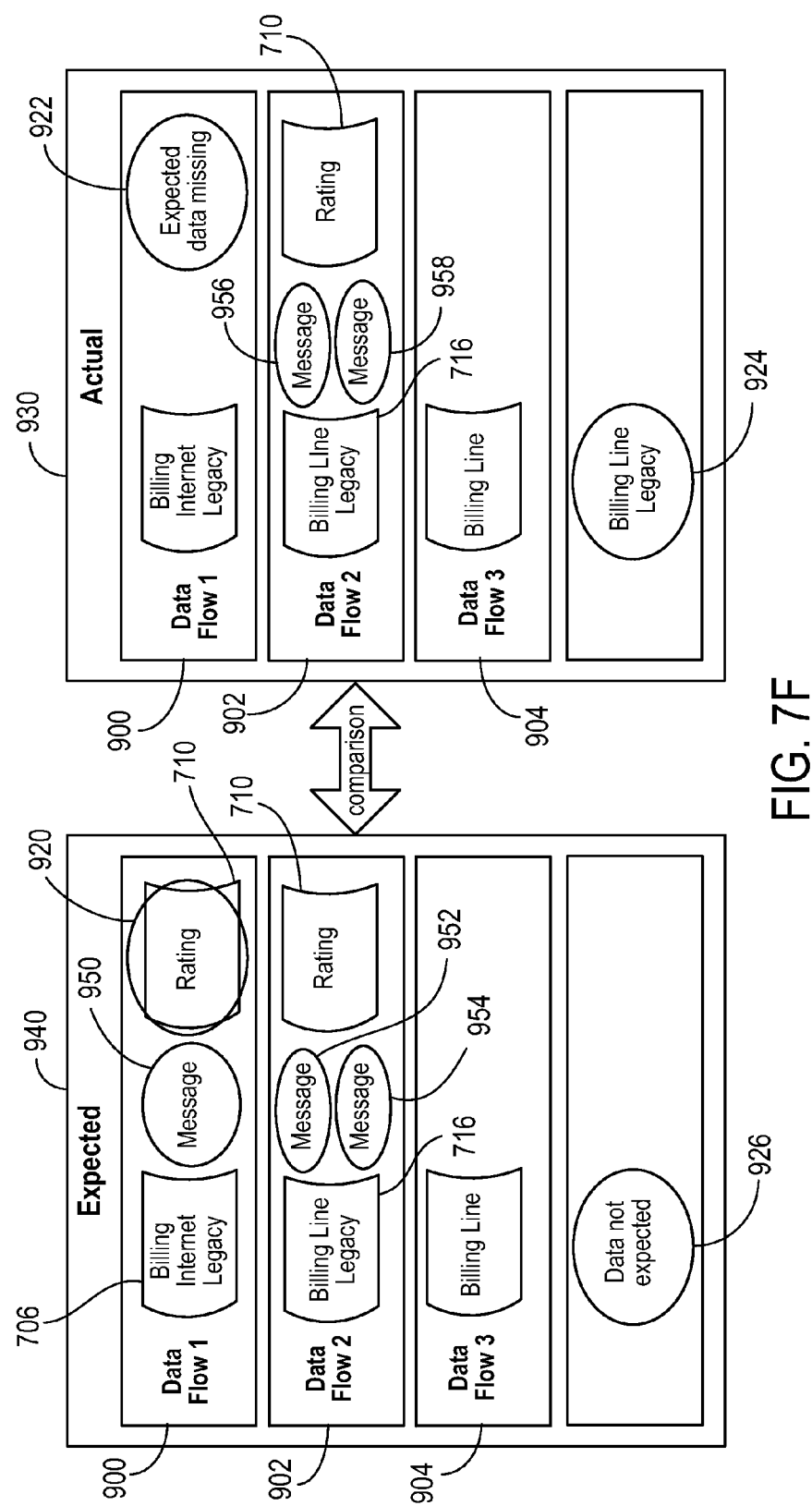
FIGS. 7F and 7G are block diagrams showing examples of discrepancies between the expected data and the actual data, and their possible root causes.

Referring to FIG. 7F, a comparison of the actual data 930 and the expected data 940 can reveal data quality issues. For example, in the data flow 900, the actual data 922 for the expected rating data 920 is missing. In addition, the actual data for billing line legacy 924 is unexpected (926).

Figure 7G:
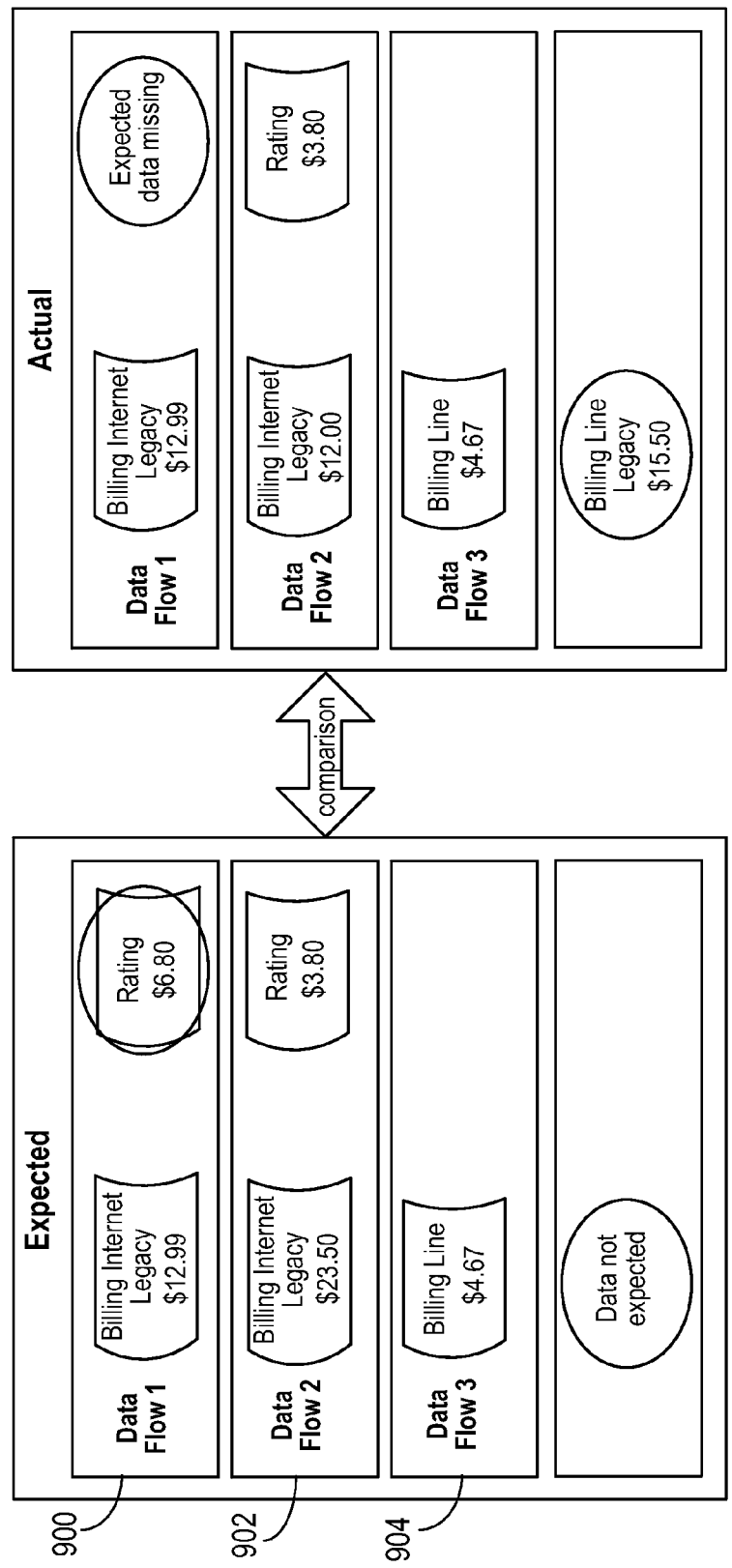

Referring to FIG. 7G, in addition to the issues revealed in FIG. 7F, the revenue assurance process also involves dollar amounts and mismatch of the actual and expected dollar amounts in the snapshots can be another type of data quality issues. The root cause of such data quality issues can be undercharging or overcharging customers, which can affect the revenue income of the business.

Figures 7H, 8:
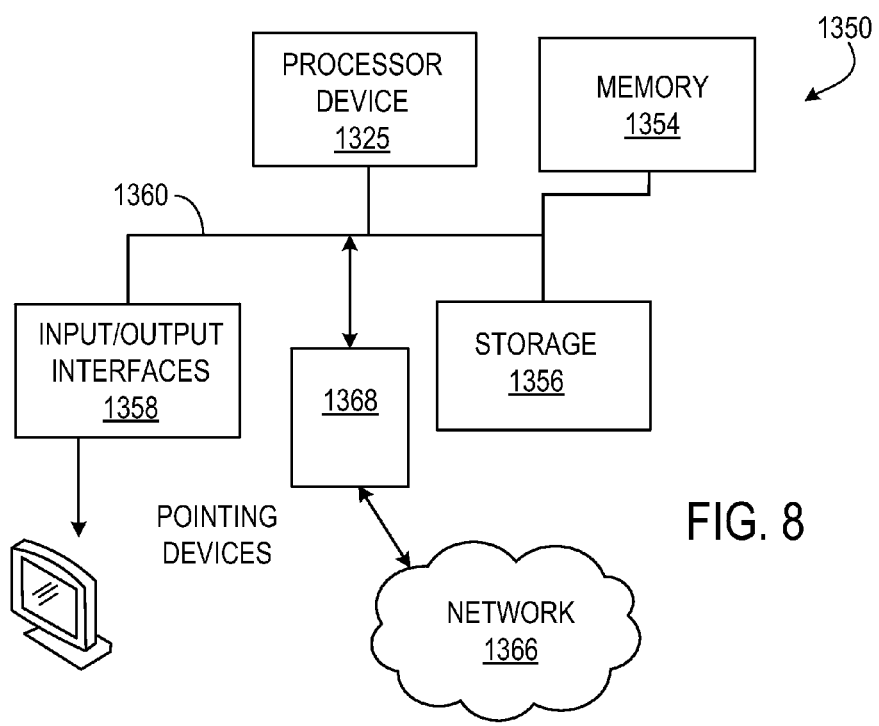
FIG. 7H shows the categorized discrepancies of FIGS. 7F and 7G.
FIG. 8 is a block diagram showing an example of a computer system implementing the methods of the disclosure.

The discrepancies of the expected values and the actual values are categorized in FIG. 7H for three data flows 900, 902, 904 and the unexpected data 924. The discrepancies show that a customer is overcharged for $15.50 and undercharged for $6.8 in the data flow 900 and for $11.50 in the data flow 902. The data flow 904 has good data quality.

Figure 6:
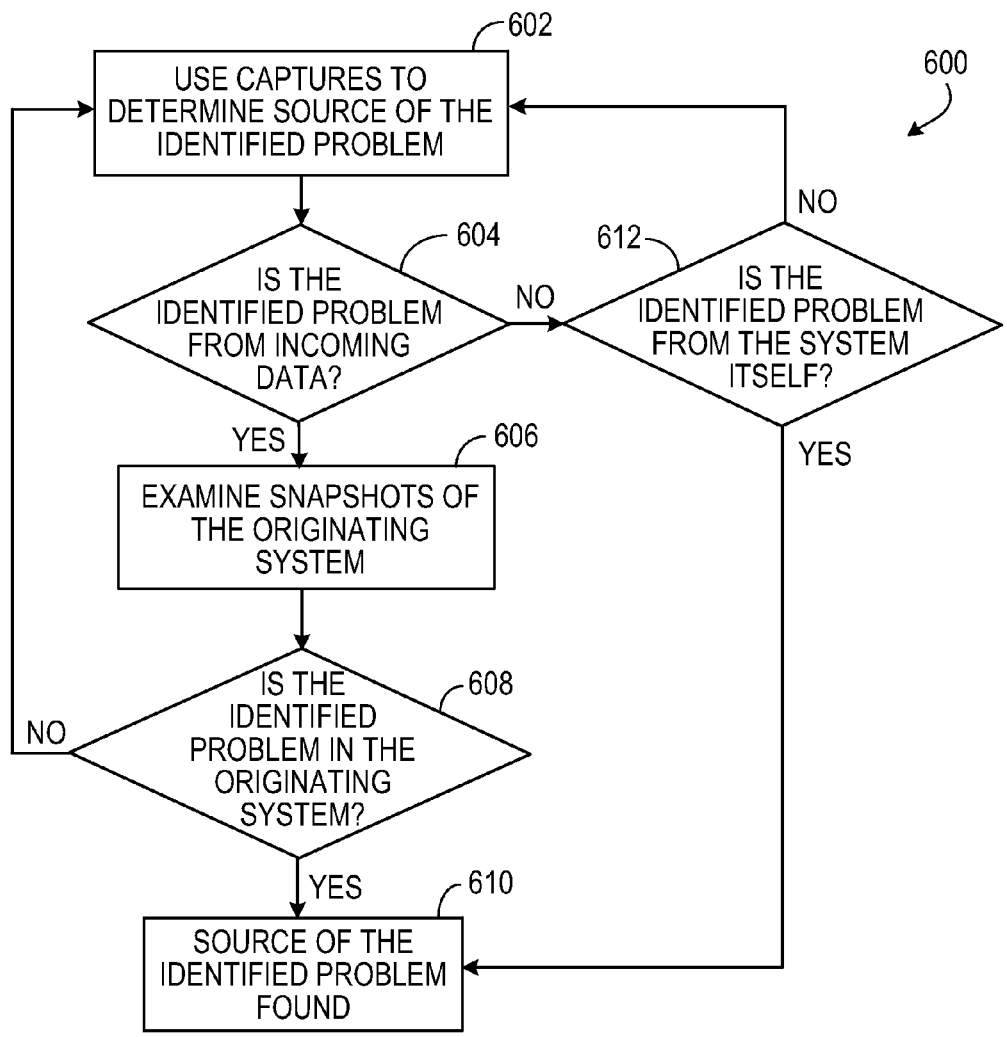
FIG. 6 is a flow diagram showing an example of a process for searching for the root cause of identified data quality issues.

The identified issues can be resolved one at a time, or the root cause of the issues can be traced and the systems in which the issues originate can be identified, e.g., as discussed with respect to FIG. 6. The issues can be resolved by removing the root cause in the identified systems. For example, referring again to FIG. 7F, the root cause of the missing actual data 922 is traced to be a missing message 950 that is expected to be sent from the billing system Internet legacy 706 to the rating system 710. The capture reveals that in reality the message is never sent, resulting in the missing data 922 in the actual context. In the data flow 902, the capture shows that messages 956, 958 have been sent between the billing system and the rating system as expected (expected messages 952, 954). However, the data in the billing system line legacy 716 is incorrect, leading to the undercharging issue (see, FIGS. 7G and 7H). In the data flow 904, all data in the involved systems and all messages sent between the systems are correct.

The context-oriented approach for analyzing data quality can provide business benefits. For example, errors in billing can be found and revenue can be improved. The cost of support (e.g., data support) can be reduced. Customer satisfaction of the business can be increased by proactively preventing problems using the approach. Failures in data processing, including unanticipated failures can be readily identified. The cost for analyzing and cleansing the data can be reduced by identifying root causes of data quality problems. Possible side effects of data cleansing can be monitored and controlled. Key performance indicator (KPI) can be analyzed and monitored in real time. The customer's behavior can also be analyzed. Sometimes in addition to snapshots and captures, streams of continuous data in a business can be acted on, e.g., structured, processed, analyzed, computed, etc. continuously based on the object model and/or the context model FIG. 8 is a schematic diagram of an example computer system 1350. The system 1350 can be used for implementing the methods discussed above. The system 1350 can include a processor device 1325, a memory 1354, a storage device 1356, and input/output interfaces 1358 interconnected via a bus 1360. The processor 1352 is capable of processing instructions within the system 1350. These instructions can implement one or more aspects of the systems, components and techniques described above. In some implementations, the processor 1352 is a single-threaded processor. In other implementations, the processor 1352 is a multi-threaded processor. The processor 1352 can include multiple processing cores and is capable of processing instructions stored in the memory 1354 or on the storage device 1354 to display graphical information for a user interface an on output monitor device 1362.

The computer system 1350 can be connected to a network 1366, e.g., the Internet, through a network interface controller 1368. The memory 1354 is a computer readable medium such as volatile or non-volatile that stores information within the system 1350. The storage device 1356 is capable of providing persistent storage for the system 1350. The storage device 1356 can include a floppy disk device, a hard disk device, an optical disk device, or a tape device, or other suitable persistent storage mediums. The storage device 1356 can store the various databases described above. The input/output device 1358 provides input/output operations for the system 1350. The input/output device 1358 can include a keyboard, a pointing device, and a display unit for displaying graphical user interfaces.

The computer system can be implemented in a computer, a hand-held device, a tablet, a cell phone, etc.

An exemplary view of a computer system is shown in FIG. 8, and is but one example. In general, embodiments of the subject matter and the functional operations described in this specification can be implemented in digital electronic circuitry, or in computer software, firmware, or hardware. Embodiments of the subject matter described in this specification can be implemented as one or more computer program products, i.e., one or more modules of computer program instructions encoded on a computer readable medium for execution by, or to control the operation of, data processing apparatus. The computer readable medium is a machine-readable storage device. The invention can be embodied in and/or or used with various apparatus, devices, and machines for processing data, including by way of example a programmable processor, a computer, or multiple processors or computers.

Figure 9:
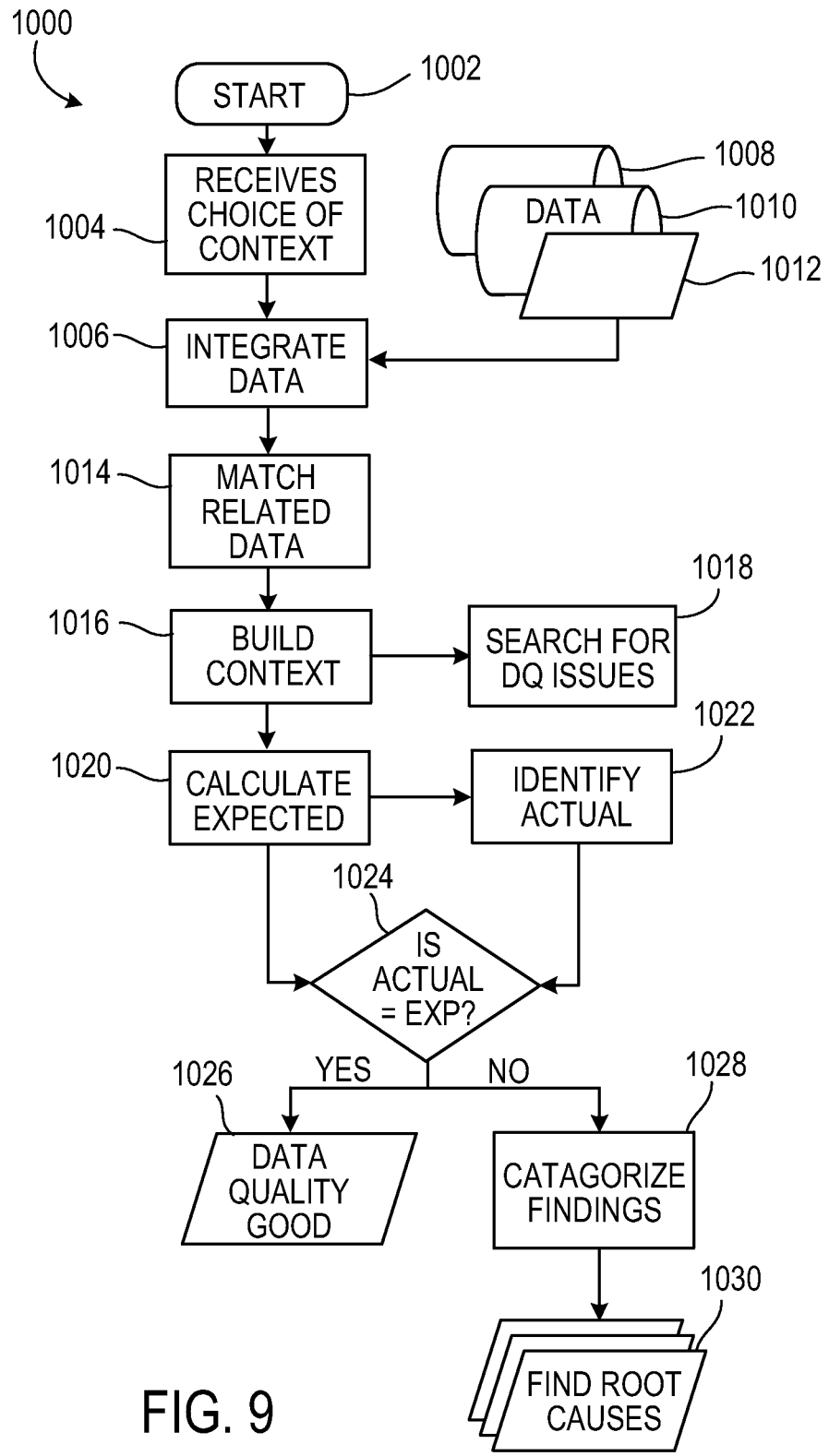
FIG. 9 is a flow diagram showing processes performed by a computer system or a processor when performing the methods of the disclosure.

Referring to FIG. 9, a computer system or a processor can be configured or instructed to perform the following steps 1000 to carry out data evaluation and root cause identification for a process. After the steps start (1002), e.g., by starting computer programs, or entering into a mode or an interface, the processor receives (1004) choice of content, e.g., made by a user through a graphical user interface or made by a computer program or the processor. Data from different systems 1008, 1010, 1012 involved in the process are integrated (1006). Next, the integrated data are matched (1014) to build (1016) contexts. Each context may be searched (1018) for possible data quality problems. The actual data for evaluation is identified (1022) and the corresponding expected data is calculated (1020). The processor then determines (1024) whether the calculated and the expected data is the same as the actual data. If the two types of data are the same, then the processor determines (1026) that the data quality for the process is good. If there are discrepancies between the two types of data, the findings of the discrepancies are categorized (1028) and the processor may further look for (1030) the root causes of the issues in data quality.

In some implementations, the contexts can be defined to allow for high-performance parallel retrieval of sets of conceptually-related objects, in addition to concurrent execution of computations, e.g., for the same-type entities (such as companies, individuals, or others based on which contexts are defined) across many nodes. The parallel retrieval and concurrent execution can be scalable and can be provided without any additional work from a user (such as a developer).

As discussed previously, contexts (and context types) are separated from each other through context boundaries that are defined based on business interests or strengths of relationships between objects. The strengths of the relationships are determined under the business context of interest. Under different business contexts, the strengths of the same relationship can be different. In some implementations, the context boundaries are selected such that different contexts can be concurrently executed by processes that are independent of each other.

Alternatively or additionally, the contexts can also be understood as being defined based on functionalities of applications to be executed in association with the objects under the business context of interest. For example, when the application involves algorithms for calculating customer satisfaction, analyzing customer behavior, identifying business trend, analyzing risks and compliance, or evaluating quality of the data and understanding of real-world processes in a real-world entity, contexts are formed such that each algorithm can be executed on a per-context basis without requiring objects or data from a different context. The application can be provided by a user and may not contain coding or programming directed to parallel execution on distributed computer nodes. However, the contexts can be distributed to multiple nodes and the application can be copied to those nodes and be implemented in parallel without additional changes made to the received copy.

A single process can be used to generate and run the context model ("schema generation"). The schema generation for the context model can use many of the techniques used for object models, including converting to an XML structure, e.g., UML to XML conversion. When a software application creates an object, that object and all related objects as defined by the context boundaries are stored as a unique context. All objects in a unique context can be stored physically together so that the objects can be readily retrieved. The computing system can leverage the contextual similarity defined by the developer to determine appropriate physical togetherness.

The different contexts can be accessed and manipulated in parallel. The single process can manipulate the generated context independently from other processes for other contexts. When the software application requests an object, the entire context of all related objects can be efficiently retrieved in response to a single query. The complete context is retrieved by traversing the object relationships from the context root object of the retrieved context to search for and identify related objects in the context. In some implementations, context snipped relationships are not traversed directly.

We use the previously discussed customer context to provide an example. The customer context may have bills, payments, purchases, addresses, and others. From the application's perspective, all that is needed to retrieve the entire customer context is an identifier for a single context root or an identity object. If a bill object has the identity, and is retrieved based on a bill identifier, the entire customer context including the bill object and the connected payment, purchase, and address objects can be retrieved at the same time.

In some implementations, for convenience, a context model can be saved to a single file. Since the context model schema can be run on a single process, the user can execute a fully functional version of the application locally on a single machine, such as a desktop computer. The file containing the context model schema can then be copied to many different physical machines and/or multiple places on a single physical machine.

In some implementations, the contexts are distributed over multiple machines (or nodes) by pairing a copy of the context model schema with a node in a distributed object database, such as an object store. One example of a persistent, disk-based distributed object store in which the context model can be implemented is described in "Persistent data storage techniques" by Barabas et al., U.S. Pat. No. 7,689,560, the entire content of which is incorporated herein by reference. The object store can maintain the relationships among objects in different physical locations and can make the summary data available locally to the objects on each side of a relationship, regardless of whether or not the objects are within or outside of the same context. One possible design for relationships in such an object store is described in "maintaining a relationship between two different items of data" by Barabas et al., U.S. Patent Publication No. 2003/0233370, the entire content of which is incorporated herein by reference. The same object(s) can belong to multiple contexts. However, only a single process or a single node can access a context directly and objects within the context are guaranteed to not be in contention for access by the different contexts. In addition to non-volatile storage, contexts can be stored all or partially in volatile memory, while allowing a similar node distribution to those discussed above, potentially on separate physical machines.

Each node can be assigned with a relative weight associated with the percentage of all contexts for which the node is responsible. In some implementations, all nodes in a distributed node system have the same weight and the contexts are distributed to each node evenly. A number of methods can be implemented to distribute the contexts. One example is assigning, based on a hashing algorithm, a context identifier to a node. The context identifier can be unique for each context. When a single node is used (as opposed to multiple nodes), the single node maintains all contexts.

The context model can scale horizontally across many nodes, e.g., on potentially different physical hardware up to the number of contexts. For example, if a context model describes a set of classes for a customer that are all within a context boundary (one context for one customer), and a company had 1,000,000 customers, then the maximum horizontal scale would be 1,000,000 nodes. If there are 1,000 nodes present, and each node had an equal relative weight, then each node would be responsible for approximately 1,000 customer contexts. Massively scalable parallelism is therefore achieved, e.g., automatically without a user's intervention.

In addition, query parallelism can also be achieved automatically. A user can submit a query to find specific objects, e.g., in many object stores. Upon receiving the query, each node iterates the query over all the contexts for which the node is responsible, independently of other nodes. All distributed nodes can perform the search in parallel.

In some implementations, an object requested by the user has a computed attribute. The node responsible for storing that object's context can perform the computation and return the result. Accordingly, scalable concurrent execution of all entities (that are represented by the contexts) of a similar type can also be automatically achieved. For example, as previously mentioned, a computed attribute age can be defined on a customer record class that contained a customer birthdate attribute. Assuming that the customer record is modeled as part of a customer context, each node can compute the age for all customer contexts for which the node is responsible, independently of all other customer contexts on other nodes and without any additional structuring or distribution of the data.

The context model allows for execution of computations with the entire context in a context parallel, horizontally scalable, and node concurrent manner. Each node is free to perform the computation specified in the computed attribute without contention for objects in the context. For example, if a computed attribute bill total is defined on the customer bill class that computes the sum of a collection of bill line items objects, and bill line item objects and customer bill objects are part of the same context, then any customer bill total in any context can be computed independently of any other contexts. Each context can have the computation performed on its objects in parallel, and each node can perform the computation on its objects concurrently with all other nodes.

The data distribution and concurrent processing capabilities of the software application built with the context model can also be used to perform object and context oriented analytics. This can be useful when the analytics is needed for individual group of conceptually-related objects that is describable as a context through the context model. For example, again using the example of a customer context, a user may wish to compute the profit and support cost of each customer for a period of time. With contexts, all the data needed for both calculations can be available local to the customer. A customer context can contain a customer record, bills with line items, and support interactions with the time spent for each interaction. The arithmetic computation can be readily performed under the context.

The computations can be scaled based on the performance needs of the business, at least because the computations can be executed in parallel on all contexts, and each node can compute over its contexts concurrently with other nodes. In some implementations, when there is enough computational hardware where there is a node for each customer context, computations can be run in parallel for all customers in the same amount of time that it would have taken to run on a single node for one customer.

The data structures, the object models, and the context models can be applied to data processing of any real-world entity, although the discussions above used businesses as an example. For example, the real-world entity can be a government or government agency, a school, or others. Evaluating data quality is one example of the use of the data structures and the models. There can be other implementations, e.g., any operations of the data. The software applications can be installed on a user's machine, such as a computer or a mobile device, or can be provided to a user through a network, e.g., the Internet.

Other embodiments are within the scope of the following claims.

What is claimed is:

1. A machine-based method comprising:
with respect to an application specification comprising one or more algorithms each not necessarily suitable for concurrent execution on multiple nodes in parallel:
grouping one or more different object classes into one or more groups each of the one or more groups representing the application specification and each of the one or more groups being based on a context, each of the groups being appropriate for executing the one or more algorithms of the application specification based on data that is available in instances of objects of the one or more different object classes of the group;
enabling a user to code an algorithm of the one or more algorithms for one of the one or more groups based on the context for execution in a single threaded environment without regard to concurrent execution of the algorithm on the multiple nodes in parallel;
distributing instances of the coded algorithm to corresponding nodes to be executed without needing additional coding;
causing each of the instances of the coded algorithm to be executed on the corresponding node as part of executing at least one instance of the group independently of and in parallel to executing other instances of the coded algorithm on other nodes also as part of executing the at least one instance of the group, each instance of the group comprising instances of objects of the object classes of the group, each of the instances of the objects having referential relationships only to other objects of the group; and
the coded algorithm being executed on a node using one process to access an instance of an object without contention from other processes used for concurrently executing other instances of the coded algorithm.

2. The machine-based method of claim 1, wherein each of the multiple nodes comprises a physical node.

3. The machine-based method of claim 1, wherein each node comprises a single thread for executing the coded algorithm.

4. The machine-based method of claim 1, wherein each node comprises a single process for executing the coded algorithm.

5. The machine-based method of claim 1, wherein the one or more algorithms comprise a business function.

6. The machine-based method of claim 1, comprising causing the coded algorithm to be executed on each node on a single instance of a group using a single process, and wherein different processes are independent of each other.

7. The machine-based method of claim 1, comprising assigning a weight to each node, the weight being proportional to a number of instances associated with the node.

8. The machine-based method of claim 7, wherein the weight is the same for all nodes to which copies of the coded algorithm are distributed.

9. The machine-based method of claim 1, comprising distributing copies of the coded algorithm to additional nodes and causing the coded algorithm to be executed on each of those additional nodes without affecting the existing distribution of the coded algorithm and the existing execution of the coded algorithm.

10. The machine-based method of claim 1, wherein each node is associated with a single instance.

11. The machine-based method of claim 10, wherein each node is assigned with a unique identifier that identifies the corresponding single instance.

12. The machine-based method of claim 1, wherein each instance is associated with a single copy of the coded algorithm and a single node.

13. The machine-based method of claim 1, comprising identifying a root object class within each group and enabling retrieving an entire instance of a group based on an object of the root object class contained in the instance.

14. The machine-based method of claim 1, comprising enabling a user to save meta data of the grouping into a single file.

15. The machine-based method of claim 1, wherein causing the coded algorithm to be executed on each node in association with at least one instance of a group independently of and in parallel to executing the other instances of the coded algorithm on other nodes comprises: causing the coded algorithm to be executed on each node in association with at least one instance of a group without requiring data access to other groups in the one or more groups.

16. The machine-based method of claim 1, wherein the context comprises a particular business context.

17. A computer program product residing on a non-transitory computer readable medium, the computer program product comprising instructions for causing a processor to:
with respect to an application specification comprising one or more algorithms each not necessarily suitable for concurrent execution on multiple nodes in parallel:
group one or more different object classes into one or more groups each of the one or more groups representing the application specification and each of the one or more groups being based on a context, each of the groups being appropriate for executing the one or more algorithms of the application specification based on data that is available in instances of objects of the one or more different object classes of the group;
enable a user to code an algorithm of the one or more algorithms for one of the one or more groups based on the context for execution in a single threaded environment without regard to concurrent execution of the algorithm on the multiple nodes in parallel;
distribute instances of the coded algorithm to corresponding nodes to be executed without needing additional coding;
causing each of the instances of the coded algorithm to be executed on the corresponding node as part of executing at least one instance of the group independently of and in parallel to executing other instances of the coded algorithm on other nodes also as part of executing the at least one instance of the group, each instance of the group comprising instances of objects of the object classes of the group, each of the instances of the objects having referential relationships only to other objects of the group; and
the coded algorithm being executed on a node using one process to access an instance of an object without contention from other processes used for concurrently executing other instances of the coded algorithm.

18. The computer program product of claim 17, wherein each of the multiple nodes comprises a physical node.

19. The computer program product of claim 17, wherein each node comprises a single thread for executing the coded algorithm.

20. The computer program product of claim 17, wherein each node comprises a single process for executing the coded algorithm.

21. The computer program product of claim 17, wherein the one or more algorithms comprise a business function.

22. The computer program product of claim 17, comprising instructions for causing the processor to cause the coded algorithm to be executed on each node on a single instance of a group using a single process, and wherein different processes are independent of each other.

23. The computer program product of claim 17, comprising instructions for causing the processor to assign a weight to each node, the weight being proportional to a number of instances associated with the node.

24. The computer program product of claim 23, wherein the weight is the same for all nodes to which copies of the coded algorithm are distributed.

25. The computer program product of claim 17, comprising instructions for causing the processor to distribute copies of the coded algorithm to additional nodes and to cause the coded algorithm to be executed on each of those additional nodes without affecting the existing distribution of the coded algorithm and the existing execution of the coded algorithm.

26. The computer program product of claim 17, wherein each node is associated with a single instance.

27. The computer program product of claim 26, wherein each node is assigned with a unique identifier that identifies the corresponding single instance.

28. The computer program product of claim 17, wherein each instance is associated with a single copy of the coded algorithm and a single node.

29. The computer program product of claim 17, comprising instructions for causing the processor to identify a root object class within each group and enable retrieving an entire instance of a group based on an object of the root object class contained in the instance.

30. The computer program product of claim 17, comprising instructions to cause the processor to enable a user to save meta data of the grouping into a single file.

31. The computer program product of claim 17, wherein causing the coded algorithm to be executed on each node in association with at least one instance of a group independently of and in parallel to executing the other instances of the coded algorithm on other nodes comprises: causing the coded algorithm to be executed on each node in association with at least one instance of a group without requiring data access to other groups in the one or more groups.

32. The computer program product of claim 17, wherein the context comprises a particular business context.

33. A computer system comprising:
a processor;
a memory; and
a storage device that stores a program for execution by the processor using the memory, the program comprising instructions configured to cause the processor to:
with respect to an application specification comprising one or more algorithms each not necessarily suitable for concurrent execution on multiple nodes in parallel:
group one or more different object classes into one or more groups each of the one or more groups representing the application specification and each of the one or more groups being based on a context, each of the groups being appropriate for executing the one or more algorithms of the application specification based on data that is available in instances of objects of the one or more different object classes of the group;

enable a user to code an algorithm of the one or more algorithms for one of the one or more groups based on the context for execution in a single threaded environment without regard to concurrent execution of the algorithm on the multiple nodes in parallel;

distribute instances of the coded algorithm to corresponding nodes to be executed without needing additional coding;

cause each of the instances of the coded algorithm to be executed on the corresponding node as part of executing at least one instance of the group independently of and in parallel to executing other instances of the coded algorithm on other nodes also as part of executing the at least one instance of the group, each instance of the group comprising instances of objects of the object classes of the group, each of the instances of the objects having referential relationships only to other objects of the group; and the coded algorithm being executed on a node using one process to access an instance of an object without contention from other processes used for concurrently executing other instances of the coded algorithm.

34. The system of claim 33, wherein each of the multiple nodes is comprises a physical node.

35. The system of claim 33, wherein each node comprises a single thread for executing the coded algorithm.

36. The system of claim 33, wherein each node comprises a single process for executing the coded algorithm.

37. The system of claim 33, wherein the one or more algorithms comprise a business function.

38. The system of claim 33, wherein the program comprises instructions configured to cause the processor to cause the coded algorithm to be executed on each node on a single instance of a group using a single process, and wherein different processes are independent of each other.

39. The system of claim 33, wherein the program comprises instructions configured to cause the processor to assign a weight to each node, the weight being proportional to a number of instances associated with the node.

40. The system of claim 39, wherein the weight is the same for all nodes to which copies of the coded algorithm are distributed.

41. The system of claim 33, wherein the program comprises instructions configured to cause the processor to distribute copies of the coded algorithm to additional nodes and to cause the coded algorithm to be executed on each of those additional nodes without affecting the existing distribution of the coded algorithm and the existing execution of the coded algorithm.

42. The system of claim 33, wherein each node is associated with a single instance.

43. The system of claim 42, wherein each node is assigned with a unique identifier that identifies the corresponding single instance.

44. The system of claim 33, wherein each instance is associated with a single copy of the coded algorithm and a single node.

45. The system of claim 33, wherein the program comprises instructions configured to cause the processor to identify a root object class within each group and enable retrieving an entire instance of a group based on an object of the root object class contained in the instance.

46. The system of claim 33, wherein the program comprises instructions configured to cause the processor to enable a user to save meta data of the grouping into a single file.

47. The system of claim 33, wherein causing the coded algorithm to be executed on each node in association with at least one instance of a group independently of and in parallel to executing the other copies instances of the coded algorithm on other nodes comprises: causing the coded algorithm to be executed on each node in association with at least one instance of a group without requiring data access to other groups in the one or more groups.

48. The system of claim 33, wherein the context comprises a particular business context.

* * * * *